(12) United States Patent
Takasu et al.

(10) Patent No.: US 10,043,169 B2
(45) Date of Patent: Aug. 7, 2018

(54) POINT-OF-SALE PRINTER INTERPRETING A MARKUP LANGUAGE FROM A CLIENT DEVICE TO CONTROL A SCANNER USING SCANNER-CONTROL COMMANDS

(71) Applicant: Seiko Epson Corporation, Tokyo (JP)

(72) Inventors: Kazuhiro Takasu, Shiojiri (JP); Koichiro Tsutsumi, Matsumoto (JP); Shigeo Ikeda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/269,172

(22) Filed: Sep. 19, 2016

(65) Prior Publication Data

US 2017/0004480 A1  Jan. 5, 2017

Related U.S. Application Data

(63) Continuation of application No. 14/984,029, filed on Dec. 30, 2015, now Pat. No. 9,495,121, which is a
(Continued)

(51) Int. Cl.
*G06F 3/12* (2006.01)
*G06Q 20/20* (2012.01)
(Continued)

(52) U.S. Cl.
CPC ......... *G06Q 20/209* (2013.01); *G06F 3/1204* (2013.01); *G06F 3/1205* (2013.01); *G06F 3/1207* (2013.01); *G06F 3/1209* (2013.01); *G06F 3/1236* (2013.01); *G06F 3/1246* (2013.01); *G06F 3/1253* (2013.01); *G06F 3/1279* (2013.01); *G06F 3/1284* (2013.01);
(Continued)

(58) Field of Classification Search
CPC .... G06Q 20/20; G07G 1/0009; Y10S 902/22; G06F 3/1298; G06F 3/1236; G06F 3/1209; G06F 17/3092; G06F 17/272; G06F 3/1246; H04N 1/00461; H04N 1/00464
USPC ............................................ 358/1.15; 705/16
See application file for complete search history.

(56) References Cited

U.S. PATENT DOCUMENTS

| 5,594,920 A | 1/1997 | Ebina et al. |
| 5,707,162 A | 1/1998 | Kasai et al. |
| (Continued) | | |

FOREIGN PATENT DOCUMENTS

| CN | 1574843 A | 2/2005 |
| EP | 991227 A2 | 4/2000 |
| (Continued) | | |

OTHER PUBLICATIONS

Final Office Action dated Mar. 16, 2017 in co-pending U.S. Appl. No. 14/979,291 (19 pgs.).
(Continued)

*Primary Examiner* — Eric A Rust
(74) *Attorney, Agent, or Firm* — Foley & Lardner LLP

(57) ABSTRACT

A device control system has a terminal 3 with an application 31, and a printer 5 that controls a scanner, or other device. The terminal 3 sends a request written in XML generated by the application 31. The printer 5 receives the XML request, and the terminal 3 receives an XML response. If the terminal 3 requested control of the scanner in the XML request, the terminal controls the scanner.

7 Claims, 89 Drawing Sheets

Related U.S. Application Data continuation of application No. 14/140,301, filed on Dec. 24, 2013, now Pat. No. 9,280,305.

(60) Provisional application No. 61/748,232, filed on Jan. 2, 2013.

(51) Int. Cl.
  *H04N 1/32* (2006.01)
  *G06K 15/02* (2006.01)
  *H04N 1/00* (2006.01)
  *G07G 1/14* (2006.01)

(52) U.S. Cl.
  CPC .......... *G06F 3/1286* (2013.01); *G06F 3/1291* (2013.01); *G06F 3/1292* (2013.01); *G06F 3/1294* (2013.01); *G06F 3/1297* (2013.01); *G06F 3/1298* (2013.01); *G06K 15/02* (2013.01); *G06Q 20/202* (2013.01); *G06Q 20/208* (2013.01); *G07G 1/14* (2013.01); *H04N 1/00334* (2013.01); *H04N 1/32* (2013.01)

(56) References Cited

U.S. PATENT DOCUMENTS

| | | |
|---|---|---|
| 5,752,880 A | 5/1998 | Gabai et al. |
| 5,794,214 A | 8/1998 | Ebina et al. |
| 5,927,878 A | 7/1999 | Kasai et al. |
| 6,022,273 A | 2/2000 | Gabai et al. |
| 6,075,195 A | 6/2000 | Gabai et al. |
| 6,128,415 A | 10/2000 | Hultgren et al. |
| 6,289,371 B1 | 9/2001 | Kumpf et al. |
| 6,368,177 B1 | 4/2002 | Gabai et al. |
| 6,519,048 B1 | 2/2003 | Tanaka |
| 7,369,257 B2 * | 5/2008 | Enomoto ........... H04N 1/00204 358/1.15 |
| 2001/0021669 A1 | 9/2001 | Gabai et al. |
| 2001/0031652 A1 | 10/2001 | Gabai et al. |
| 2002/0097408 A1 | 7/2002 | Chang et al. |
| 2004/0105126 A1 | 6/2004 | Minowa et al. |
| 2004/0266479 A1 | 12/2004 | Oak |
| 2005/0046887 A1 | 3/2005 | Shibata et al. |
| 2006/0164550 A1 | 7/2006 | Yoshimoto et al. |
| 2006/0279773 A1 | 12/2006 | Sakurai et al. |
| 2007/0058194 A1 * | 3/2007 | Itoh ................... H04N 1/00204 358/1.15 |
| 2007/0198999 A1 | 8/2007 | Ohhashi |
| 2007/0276763 A1 | 11/2007 | Kleinman et al. |
| 2009/0188972 A1 | 7/2009 | Koakutsu |
| 2010/0027065 A1 | 2/2010 | Koakutsu |
| 2010/0085601 A1 | 4/2010 | Urakawa |
| 2010/0100606 A1 | 4/2010 | Nakamura et al. |
| 2010/0153225 A1 | 6/2010 | Ferro et al. |
| 2010/0177343 A1 * | 7/2010 | Shapiro ............. G06Q 10/0637 358/1.15 |
| 2011/0194123 A1 | 8/2011 | Sweet et al. |
| 2011/0292447 A1 | 12/2011 | Oak |
| 2013/0332520 A1 | 12/2013 | Nakamura et al. |
| 2014/0058869 A1 | 2/2014 | Argue et al. |

FOREIGN PATENT DOCUMENTS

| | | |
|---|---|---|
| EP | 2631808 A1 | 8/2013 |
| JP | 2000-500376 | 1/2000 |
| JP | 2004-152256 | 5/2004 |
| JP | 2006-135982 | 5/2006 |
| JP | 2007-188468 | 7/2007 |
| JP | 2007-328558 | 12/2007 |
| JP | 2010-134906 | 6/2010 |
| JP | 2011-124914 | 6/2011 |
| JP | 2012-173910 | 9/2012 |
| KR | 10-0172460 B1 | 3/1999 |

OTHER PUBLICATIONS

NPL—The Transport Layer Security (TLS) Protocol Version 1.2, Aug. 2008.
U.S. Office Action dated Oct. 13, 2017 in related U.S. Appl. No. 14/979,291 (21 pgs.).
Wikipedia article titled "Software Incompatibility", retrieved Mar. 6, 2018 from https://en.wikipedia.org (1 pg.).
Final Office Action dated Mar. 9, 2018 in related U.S. Appl. No. 14/979,291 (19 pgs.).

* cited by examiner

| Key | KeyCode (Decimal) | Key | KeyCode (Decimal) |
|---|---|---|---|
| Backspace | 8 | Numbers on the keyboard | |
| Tab | 9 | 5 | 53 |
| Enter | 13 | 6 | 54 |
| Shift | 16 | 7 | 55 |
| Ctrl | 17 | 8 | 56 |
| Alt | 18 | 9 | 57 |
| Esc | 27 | Alphabets on the keyboard | |
| Space | 32 | A | 65 |
| PgUp | 33 | B | 66 |
| PgDn | 34 | C | 67 |
| End | 35 | D | 68 |
| Home | 36 | E | 69 |
| ! | 37 | F | 70 |
| # | 38 | G | 71 |
| ¡ | 39 | H | 72 |
| $ | 40 | I | 73 |
| Insert | 45 | J | 74 |
| Delete | 46 | K | 75 |
| Numbers on the keyboard | | L | 76 |
| 0 | 48 | M | 77 |
| 1 | 49 | N | 78 |
| 2 | 50 | O | 79 |
| 3 | 51 | P | 80 |
| 4 | 52 | Q | 81 |

FIG. 3A

| Key | | KeyCode (Decimal) | Key | | KeyCode (Decimal) |
|---|---|---|---|---|---|
| Alphabets on the keyboard | | | Function key | | |
| | R | 82 | | F6 | 117 |
| | S | 83 | | F7 | 118 |
| | T | 84 | | F8 | 119 |
| | U | 85 | | F9 | 120 |
| | V | 86 | | F10 | 121 |
| | W | 87 | | F11 | 122 |
| | X | 88 | | F12 | 123 |
| | Y | 89 | : | | 186 |
| | Z | 90 | ; | | 187 |
| Numeric keypad | | | , | | 188 |
| | * | 106 | - | | 189 |
| | + | 107 | . | | 190 |
| | / | 109 | / | | 191 |
| Function key | | | @ | | 192 |
| | F1 | 112 | [ | | 219 |
| | F2 | 113 | \ | | 220 |
| | F3 | 114 | ] | | 221 |
| | F4 | 115 | ^ | | 222 |
| | F5 | 116 | Caps Lock | | 240 |

| Item | Description |
|---|---|
| Printer | Used to set a TM printer to be controlled by TM-T88V-DT. |
| Display | Used to set a customer display to be controlled by TM-T88V-DT. |
| Key input device | Used to set a key input device to be controlled by TM-T88V-DT. |
| Serial communications | Used to set a serial communication device to be controlled by TM-T88V-DT. |
| Other | Used to set other device to be controlled by TM-T88V-DT. |

FIG. 11

| Item | Description |
|---|---|
| Device ID | Enter the ID (any character string) of the printer to be controlled. |
| Type | Select "Network printer". |
| Model no. | Select the model of the printer to be controlled. |
| IP Address | Specify the IP address of the printer for each device ID. |
| Retry interval | Specify the retry interval after timeout. |

FIG. 12

| Item | Description |
|---|---|
| Communications settings | Set the communication speed, data bit and parity. |
| Brightness settings | Set the brightness of the customer display. |

FIG. 13

| Item | Description |
|---|---|
| Device ID | Enter the device ID (any character string). |
| Device name | Select the device name of the key input device. |
| Control Script | Select the device control script to be used for the key input device. |

FIG. 14

| Item | Description |
|---|---|
| Device ID | Enter the device ID (any character string). |
| Device name | Select the device name of the serial communication device. The name can be selected from the product names and ports. |
| Control script | Select the device control script to be used for the serial communication device. |
| Communication speed(bps) | Set the communication speed of the device. |
| Data bit | Set the data bit. |
| Parity | Set the parity. |
| Stop bit | Set the stop bit. |
| Flow control | Set the flow control. |

FIG. 15

| Item | Description |
|---|---|
| Device ID | Enter the device ID (any character string). |
| Control script | Select the device control script to be used for the connected device. |

FIG. 16

| Transport layer | Port No. |
|---|---|
| TCP | 8009 |

| Data name | Description |
|---|---|
| Communication message | "UTF-8" character string in XML format<br>Any length |
| Terminating character | NULL character ("\0")<br>1 byte |

| Applications | | ePOS-Device | Description |
|---|---|---|---|
| Establishment of TCP/IP connection | → | | Establishment of connection |
| | ← | `<connect></connect>"\0"` | |
| `<admin_info></admin_info>"\0"` | → | | Acquisition of the administrator information. |
| | ← | `<admin_info>`<br>`<code>OK</code>`<br>`<data>`<br>`<admin_name>ep-admin</admin_name>`<br>`<location>Counter01</location>`<br>`</data>`<br>`</admin_info>"\0"` | |
| `<open_device>`<br>`<device_id>keyboard01</device_id>`<br>`<data>`<br>`<type>type_keyboard</type>`<br>`</data>`<br>`</open_device>"\0"` | → | | Device open |
| | ← | `<open_device>`<br>`<device_id>keyboard01</device_id>`<br>`<code>OK</code>`<br>`</open_device>"\0"` | |
| `<device_data>`<br>`<device_id>keyboard01</device_id>`<br>`<data>`<br>`<type>setprefix</type>`<br>`<keycode>49</keycode>`<br>`<keycode>50</keycode>`<br>`<keycode>51</keycode>`<br>`</data>`<br>`</device_data>"\0"` | → | | Device control |
| | ← | `<device_data>`<br>`<device_id>keyboard01</device_id>`<br>`<data>`<br>`<type>onkeypress</type>`<br>`<keycode>49</keycode>`<br>`<ascii>a</ascii>`<br>`</data>`<br>`</device_data>"\0"`<br><br>`<device_data>`<br>`<device_id>keyboard01</device_id>`<br>`<data>`<br>`<type>onstring</type>`<br>`<input>11223344556677</input>`<br>`<prefix>a</prefix>`<br>`</data>`<br>`</device_data>"\0"` | |

FIG. 20A

| Applications | ePOS-Device | Description |
|---|---|---|
| `<close_device>`<br>`<device_id>keyboard01</device_id>`<br>`</close_device>"\0"` | | Device close |
| | `<close_device>`<br>`<device_id>keyboard01</device_id>`<br>`<code>OK</code>`<br>`</close_device>"\0"` | |
| Disconnection of connection | | |

FIG. 20B

```
<data>
   <type>setprefix</type>
   <keycodes array="true">49</keycodes>
   <keycodes>50</keycodes>
   <keycodes>51</keycodes>
   <keycodes>52</keycodes>
</data>
```

FIG. 21

| Message | | Description |
|---|---|---|
| Communication path | <connect> | Establishes a communication path with ePOS-Device Service I/F |
| Administrator information | <admin_info> | Acquires administrator and installation location information |
| Device open / close | <open_device> | Opens communication with a device |
| | <close_device> | Closes communication with a device |
| Send device control data | <device_data> | Requests device control |
| | <device_data> | Responds to device control |
| Error notification | <error> | Notifies you of error contents when an error occurs |

FIG. 22

| Device type | Value for <type> element | Description |
|---|---|---|
| Barcode Scanner | ondata | Scan data from a barcode scanner <Response> |
| Printer | print | Print data and setting data to printers <Request> |
| | onxmlresult | Data from printers<Response> |
| Customer Display | display | Display data and setting data to the customer display<Request> |
| | onxmlresult | Data from the customer display <Response> |
| POS Keyboard | onkeypress | Input character strings from the POS keyboard <Response> |
| | setprefix | Designates the key code to determine the start of character strings to detect input from the POS keyboard <Request> |
| | onstring | Input character strings from the POS keyboard <Response> |
| Serial Device | sendcommand | Sends commands to the serial device <Request> |
| | oncommandreply | Data from the serial device<Response> |

FIG. 23

| Sub-element | Data type | Description |
|---|---|---|
| code | string | Result of acquiring the administrator information<br>For details, refer to the code below. |
| data | string | Administrator information<br>Only returned if successfully acquired.<br>For details, refer to the data below. |

FIG. 24A

| Element value | Description |
|---|---|
| "OK" | Successfully acquired |
| "COMMAND_PARAM_ILLEGAL" | Parameter error occurred |
| "SYSTEM_ERROR" | System error occurred |

FIG. 24B

| Sub-element | Data type | Description |
|---|---|---|
| admin_name | string | Administrator information |
| location | string | Installation location information |

FIG. 24C

| Character string before replacement | After replacement |
|---|---|
| & (Ampersand) | & |
| > (Greater-than symbol) | > |
| < (Lesser-than symbol)< | < |
| "(Double quotation mark) | " |
| ' (Single quotation mark)' | ' |

FIG. 24D

Normal

```
<admin_info>
 <code>OK</code>
   <data>
     <admin_name>Administrator A</admin_name>
     <location>Counter1&Counter2</location>
   </data>
</admin_info>
```

Error

```
<admin_info>
 <code>COMMAND_PARAM_ILLEGAL</code>
</admin_info>
```

FIG. 24E

| Sub-element | Data type | Description |
|---|---|---|
| device_id | string | The device ID designated with TMNet WebConfig. The customer display is "local_display". |
| data | string | Designates the type of the device to open. For details, refer to the data below. |

FIG. 25A

| Element value | Description |
|---|---|
| "type_scanner" | Barcode scanner |
| "type_keyboard" | POS keyboard |
| "type_printer" | Printer |
| "type_display" | Customer display |
| "type_simple_serial" | Serial communication device |

FIG. 25B

```
<open_device>
  <device_id>scanner_001</device_id>
  <data>
    <type>type_scanner</type>
  </data>
</open_device>
```

FIG. 25C

| Sub-element | Data type | Description |
|---|---|---|
| device_id | string | The device ID designated with the request. |
| code | string | The processing result. For details, refer to the code below. |

FIG. 25D

| Element value | Description |
|---|---|
| "OK" | Processed successfully |
| "DEVICE_NOT_FOUND" | The designated device does not exist |
| "DEVICE_IN_USE" | The designated device is in use |
| "DEVICE_OPEN_ERROR" | Failed to open the designated device |
| "DRIVER_ERROR" | An error occurred in the device control script |
| "SYSTEM_ERROR" | System error occurred |
| "DEVICE_CATEGORY_INVALID" | The designated device type is invalid |
| "COMMAND_PARAM_ILLEGAL" | Parameter error occurred |

FIG. 25E

Normal
```
<open_device>
   <code>OK</code>
   <device_id>scanner_001</device_id>
</open_device>
```

Error
```
<open_device>
   <code>DEVICE_NOT_FOUND</code>
   <device_id>scanner_001</device_id>
</open_device>
```

FIG. 25F

| Sub-element | Data type | Description |
|---|---|---|
| device_id | string | The device ID designated with TMNet WebConfig. The customer display is "local_display". |

FIG. 26A

```
<close_device>
   <device_id>local_display</device_id>
</close_device>
```

FIG. 26B

| Sub-element | Data type | Description |
|---|---|---|
| device_id | string | The device ID designated with the request. |
| code | string | The processing result. For details, refer to the code below. |

FIG. 26C

| Element value | Description |
|---|---|
| "OK" | Processed successfully |
| "DEVICE_NOT_FOUND" | The designated device does not exist |
| "DEVICE_NOT_OPEN" | The designated device ID is not open |
| "DEVICE_CLOSE_ERROR" | Failed to close the designated device |
| "SYSTEM_ERROR" | System error occurred |
| "COMMAND_PARAM_ILLEGAL" | Parameter error occurred |

FIG. 26D

Normal

```
<close_device>
   <device_id>local_display</device_id>
   <code>OK</code>
</close_device>
```

Error

```
<close_device>
   <device_id>scanner_001</device_id>
   <code>DEVICE_NOT_FOUND</code>
</close_device>
```

FIG. 26E

| Sub-element | Data type | Description |
|---|---|---|
| sequence | string | An arbitrary value to specify request messages during sending errors. If you designate a request message, it will be set in the sequence of the error message during an error. |
| device_id | string | The opened device ID. |
| data | string | Data for device control. Contents are defined for each device type. For details, refer to Message Data for Each Device. |

FIG. 27A

```
<device_data>
   <sequence>123</sequence>
   <device_id>poskeyboard001</device_id>
   <data>
      <type>setprefix</type>
      <keycodes array="true">49</keycodes>
      <keycodes>50</keycodes>
      <keycodes>51</keycodes>
      <keycodes>52</keycodes>
   </data>
</device_data>
```

FIG. 27B

| Sub-element | Data type | Description |
|---|---|---|
| sequence | string | Fixed as 0 |
| device_id | string | Device ID where the data occurred |
| data | string | Data that occurred. Contents are defined for each device type. For details, refer to Message Data for Each Device. |

FIG. 27C

```
<device_data>
   <sequence>0</sequence>
   <device_id>poskeyboard001</device_id>
   <data>
      <type>onstring</type>
      <input>&2398749238429</input>
      <prefix>49</prefix>
   </data>
</device_data>
```

FIG. 27D

| Sub-element | Data type | Description |
|---|---|---|
| sequence | string | ID to specify the message that caused the error. It is the same value as the sequence designated by the request. |
| device_id | string | Device ID where the error occurred. Designated if an error is in the device control message. |
| code | string | Displays the error that occurred using a code. For details, refer to the following. |
| data | string | The details of errors based on the driver are designated when a "DRIVER_ERROR" occurs. |

FIG. 28A

• <When there is an error in <device_data>

| Element value | Description |
|---|---|
| "DEVICE_NOT_FOUND" | The designated device ID does not exist |
| "DEVICE_NOT_OPEN" | The designated device is not open |
| "SEND_ERROR" | An error occurred sending the data to the physical device |
| "DRIVER_ERROR" | Detected an error in the device |
| "PARAM_ERROR" | Parameter error occurred |
| "FUNCTION_NOT_FOUND" | The designated function does not exist in the driver |

• Any other error

| Element value | Description |
|---|---|
| "SYSTEM_ERROR" | System error occurred |

FIG. 28B

```
<error>
  <sequence>123</sequence>
  <device_id>scanner002</device_id>
  <code>DEVICE_NOT_OPEN</code>
  <data></data>
</error>
```

FIG. 28C

| Sub-element | Data type | Description |
|---|---|---|
| input | string | Scan data string received. |

FIG. 29A

| Character string before replacement | After replacement |
|---|---|
| & (Ampersand) | & |
| > (Greater-than symbol) | > |
| < (Lesser-than symbol)< | < |
| "(Double quotation mark) | " |
| ' (Single quotation mark)' | ' |

FIG. 29B

```
<data>
 <type>ondata</type>
 <input>F12345678909123</input>
</data>
```

FIG. 29C

| Sub-element | Data type | Description |
| --- | --- | --- |
| timeout | int | Sets the time out limit for requests in milliseconds. 1,000 to 60,000 (whole numbers) |
| printdata | string | Designates the data to print. For details, refer to "Printer Control XML". |

FIG. 30A

```
<data>
 <type>print</type>
 <timeout>10000</timeout>
 <printdata>
    <!-- Printer Control XML -->
    <epos-print xmlns=
         .
         .
    </epos-print>
 </printdata>
</data>
```

FIG. 30B

| Sub-element | Data type | Description |
|---|---|---|
| resultdata | string | Result of the sent data. For details, refer to <response>. |

FIG. 31A

```
<data>
 <type>onxmlresult</type>
 <resultdata>
   <response success=    />
 </resultdata>
</data>
```

FIG. 31B

| Sub-element | Function | Printer's print mode | |
|---|---|---|---|
| | | Standard mode | Page mode |
| <text> | Prints text | ● | ● |
| <feed> | Paper feed | ● | ● |
| <image> | Prints raster image | ● | ● |
| <logo> | Prints NV logo | ● | ● |
| <barcode> | Prints barcode | ● | ● |
| <symbol> | Prints symbol | ● | ● |
| <hline> | Prints horizontal line | ● | ▲ |
| <vline-begin> | Starts vertical line | ● | ▲ |
| <vline-end> | Ends vertical line | ● | ▲ |
|  | Page mode | ● | ▲ |
| <area> | Sets a page mode print area | ▲ | ● |
| <direction> | Sets a page mode print direction | ▲ | ● |
| <position> | Sets a page mode print position | ▲ | ● |
| <line> | Draws a page mode line | ▲ | ● |
| <rectangle> | Draws a page mode rectangle | ▲ | ● |
| <cut> | Paper cut | ● | ▲ |
| <pulse> | Drawer kick-out | ● | ▲ |
| <sound> | Sounds a buzzer | ● | ▲ |
| <command> | Inserts a command | ● | ● |

FIG. 32A

```
<!-- Example with a text tag added as a sub-element -->
<epos-print xmlns="http://www.epson-pos.com/schemas/2011/03/epos-print">
  <text>Hello world!!</text>
</epos-print>
```

FIG. 32B

| Attribute value | Description |
| --- | --- |
| "true" or "1" | Printing succeeded. |
| "false" or "0" | Printing failed. |

FIG. 33A

| Attribute value | Description |
| --- | --- |
| "EPTR_AUTOMATICAL" | An automatically recoverable error occurred |
| "EPTR_COVER_OPEN" | A cover open error occurred |
| "EPTR_CUTTER" | An autocutter error occurred |
| "EPTR_MECHANICAL" | A mechanical error occurred |
| "EPTR_REC_EMPTY" | No paper in roll paper end sensor |
| "EPTR_UNRECOVERABLE" | An unrecoverable error occurred |
| "SchemaError" | The request document contains a syntax error |
| "DeviceNotFound" | The printer with the specified device ID does not exist |
| "PrintSystemError" | An error occurred on the printing system |
| "EX_BADPORT" | An error was detected on the communication port |
| "EX_TIMEOUT" | A print timeout occurred |

FIG. 33B

| Attribute value | Description |
|---|---|
| "0x00000001" | No response from the TM printer |
| "0x00000002" | Printing is successfully completed |
| "0x00000004" | Status of the 3rd pin of the drawer kick-out connector = "H" |
| "0x00000008" | Offline |
| "0x00000020" | The cover is open |
| "0x00000040" | Paper is being fed by a paper feed switch operation |
| "0x00000100" | Waiting to be brought back online |
| "0x00000200" | The paper feed switch is being pressed (ON) |
| "0x00000400" | A mechanical error occurred |
| "0x00000800" | An autocutter error occurred |
| "0x00002000" | An unrecoverable error occurred |
| "0x00004000" | An automatically recoverable error occurred |
| "0x00020000" | No paper in roll paper near end sensor |
| "0x00080000" | No paper in roll paper end sensor |
| "0x01000000" | A buzzer is on (only for applicable devices) |
| "0x80000000" | The spooler has stopped |

FIG. 33C

```
<!-- Printer status -->
<!-- Successfully performed. -->
 <response success="true" code="" status=""/>
<!-- When the printer ran out of paper during printing and failed to print. -->
<response xmlns="http://www.epson-pos.com/schemas/2011/03/epos-print"
          success="false" code="EPTR_REC_EMPTY" status="252641308" />
```

FIG. 33D

| Function (symbol) | Entity Reference |
|---|---|
| & | & |
| ' | ' |
| > | > |
| < | < |
| " | " |
| Horizontal tab(HT) | 	 or 	 |
| Line feed (LF) | 
 or 
 |

FIG. 34A

| Attribute value | Description |
|---|---|
| "en"(default) | English |
| "ja" | Japanese |

FIG. 34B

| Attribute value | Description |
|---|---|
| "font_a" (default) | Font A |
| "font_b" | Font B |
| "font_c" | Font C |

FIG. 34C

| Attribute value | Description |
|---|---|
| "true" or "1" | Specifies smoothing. |
| "false" or "0" (default) | Cancels smoothing |

FIG. 34D

| Attribute value | Description |
|---|---|
| "true" or "1" | Specifies the double-sized width. |
| "false" or "0" (default) | Cancels the double-sized width |

FIG. 34E

| Attribute value | Description |
|---|---|
| "true" or "1" | Specifies the double-sized height |
| "false" or "0" (default) | Cancels the double-sized height |

FIG. 34F

| Attribute value | Description |
|---|---|
| Integer from "1" to "8" (default : "1") | Horizontal scale |

FIG. 34G

| Attribute value | Description |
|---|---|
| Integer from "1" to "8" (default : "1") | Vertical scale |

FIG. 34H

| Attribute value | Description |
|---|---|
| "true" or "1" | Specifies the inversion of black and white parts of characters. |
| "false" or "0" (default) | Cancels the inversion of black and white parts of characters. |

FIG. 34I

| Attribute value | Description |
| --- | --- |
| "true" or "1" | Specifies underlining. |
| "false" or "0" (default) | Cancels underlining. |

FIG. 34J

| Attribute value | Description |
| --- | --- |
| "true" or "1" | Specifies emphasized printing. |
| "false" or "0" (default) | Cancels emphasized printing. |

FIG. 34K

| Attribute value | Description |
| --- | --- |
| "none" | Characters are not printed. |
| "color_1" (default) | First color |
| "color_2" | Second color |
| "color_3" | Third color |
| "color_4" | Fourth color |

FIG. 34L

| Attribute value | Description |
| --- | --- |
| "left" (default) | Alignment to the left |
| "center" | Alignment to the center |
| "right" | Alignment to the right |

FIG. 34M

| Attribute value | Description |
|---|---|
| "true" or "1" | Specifies rotated printing of text. |
| "false" or "0" (default) | Cancels rotated printing of text. |

FIG. 34N

| Item | Setting |
|---|---|
| Language | English |
| Smoothing | Enable |
| Align | Center Align |
| Font | Font A |
| Double-sizing | Double width and height characters |
| Underline | Enable |

```
<text lang="en" />
<text smooth="true" />
<text align="center" />
<text font="font_a" />
<text dw="true" dh="true" />
<text ul="true" />
<text>Hello, World!
</text>
```

FIG. 34P

```
<!-- Feed paper 3 lines forward -->
   <feed line="3" />
```

```
<!-- Start a new line after printing a character string -->
   <text>Hello</text><feed />
   <text>World</text><feed />
```

FIG. 35

| Attribute value | Description |
|---|---|
| "none" | Characters are not printed. |
| "color_1" (default) | First color |
| "color_2" | Second color |
| "color_3" | Third color |
| "color_4" | Fourth color |

FIG. 36A

| Attribute value | Description |
|---|---|
| "left" (default) | Alignment to the left |
| "center" | Alignment to the center |
| "right" | Alignment to the right |

FIG. 36B

| Attribute value | Description |
|---|---|
| "mono" (default) | Monochrome (two-tone) |
| "gray16" | Multiple tones (16-tone) |

FIG. 36C

```
<!-- Print an 8 dot wide, 8 dot high filled-in raster image -->
   <image width="8" height="8">//////////8=</image>
```

FIG. 36D

| Attribute value | Description |
|---|---|
| "left" (default) | Alignment to the left |
| "center" | Alignment to the center |
| "right" | Alignment to the right |

FIG. 37A

```
<!-- Print a NV logo with key1 registered as 48 and key2 registered as 48 -->
   <logo key1="48" key2="48" />
```

FIG. 37B

| Barcode type | Barcode data specification procedure |
| --- | --- |
| UPC-A | When an 11-digit number is specified, a check digit is automatically added.<br>When a 12-digit number is specified, the 12th digit is processed as a check digit but the check digit is not validated. |
| UPC-E | Specify 0 as the first digit.<br>Specify the manufacturer code in the digits 2 to 6.<br>Specify (right-align) the item code in the digits 7 to 11. The number of item code digits varies depending on the manufacturer code. Specify 0s in empty digits.<br>When an 11-digit number is specified, a check digit is automatically added.<br>When a 12-digit number is specified, the 12th digit is processed as a check digit but the check digit is not validated. |
| EAN13 | When an 12-digit number is specified, a check digit is automatically added. |
| JAN13 | When a 13-digit number is specified, the 12th digit is processed as a check digit but the check digit is not validated. |
| EAN8 | When a 7-digit number is specified, a check digit is automatically added. |
| JAN8 | When an 8-digit number is specified, the 8th digit is processed as a check digit but the check digit is not validated. |
| CODE39 | When the first character is *, the character is processed as the start character. In other cases, a start character is automatically added. |
| ITF | Start and stop codes are automatically added.<br>Check digits are not added or validated. |
| CODABAR | Specify a start character (A to D, a to d).<br>Specify a stop character (A to D, a to d).<br>Check digits are not added or validated. |

FIG. 38A

| Barcode type | Barcode data specification procedure |
|---|---|
| CODE93 | Start and stop characters are automatically added.<br>A check digit is automatically calculated and added. |
| CODE128 | Specify a start character (CODE A, CODE B, CODE C).<br>A stop character is automatically added.<br>A check digit is automatically calculated and added.<br>To encode each of the following characters, specify two characters starting with the character "{":<br>FNC1:   {1<br>FNC2:   {2<br>FNC3:   {3<br>FNC4:   {4<br>CODE A:  {A<br>CODE B:  {B<br>CODE C:  {C<br>SHIFT:  {S<br>{:      {{ |
| GS1-128 | A start character, FNC1, a check digit, and a stop character are automatically added.<br>To automatically calculate and add a check digit for an application identifier (AI) and the subsequent data, specify the character "*" in the position of the check digit.<br>You can enclose an application identifier (AI) in parentheses. The parentheses are used as HRI print characters and are not encoded as data.<br>You can insert spaces between an application identifier (AI) and data. The spaces are used as HRI print characters and are not encoded as data.<br>To encode each of the following characters, specify two characters starting with the character "{":<br>FNC1:   {1<br>FNC3:   {3<br>(:      {(<br>):      {)<br>*:      {*<br>{:      {{ |
| GS1 DataBar Omnidirectional<br>GS1 DataBar Truncated<br>GS1 DataBar Limited | Specify a 13-digit global trade item number (GTIN) not including an application identifier (AI) or a check digit. |

FIG. 38B

| Barcode type | Barcode data specification procedure |
|---|---|
| BARCODE_GS1_DATABAR_EXPANDED | You can enclose an application identifier (AI) in parentheses. The parentheses are used as HRI print characters and are not encoded as data.<br>To encode each of the following characters, specify two characters starting with the character "{":<br>FNC1:　　　{1<br>(:　　　{(<br>):　　　{) |

FIG. 38C

| String | Description |
|---|---|
| \xnn | Control code |
| \\ | Back slash |

FIG. 38D

| Attribute value | Description |
|---|---|
| "upc_a" | UPC-A |
| "upc_e" | UPC-E |
| "ean13" | EAN13 |
| "jan13" | JAN13 |
| "ean8" | EAN8 |
| "jan8" | JAN8 |
| "code39" | CODE39 |
| "itf" | ITF |
| "codabar" | CODABAR |
| "code93" | CODE93 |
| "code128" | CODE128 |
| "gs1_128" | GS1-128 |
| "gs1_databar_omnidirectional" | GS1 DataBar Omnidirectional |
| "gs1_databar_truncated" | GS1 DataBar Truncated |
| "gs1_databar_limited" | GS1 DataBar Limited |
| "gs1_databar_expanded" | GS1 Databar Expanded |

FIG. 38E

| Attribute value | Description |
|---|---|
| "none" (default) | HRI not printed |
| "above" | Above the bar code |
| "below" | Below the bar code |
| "both" | Both above and below the bar code |

FIG. 38F

| Attribute value | Description |
|---|---|
| "font_a" (default) | Font A |
| "font_b" | Font B |
| "font_c" | Font C |

FIG. 38G

| Attribute value | Description |
|---|---|
| "left" (default) | Alignment to the left |
| "center" | Alignment to the center |
| "right" | Alignment to the right |

FIG. 38H

| Attribute value | Description |
|---|---|
| "true" or "1" | Specifies rotated printing of text. |
| "false" or "0" (default) | Cancels rotated printing of text. |

FIG. 38I

```
<!-- Print barcodes -->
<barcode type="upc_a" width="2" height="64" hri="below">012345000005</barcode>
<barcode type="upc_e">01234500005</barcode>
<barcode type="ean13">2012345678905</barcode>
<barcode type="jan13">2012345678905</barcode>
<barcode type="ean8">2012345</barcode>
<barcode type="jan8">2012345</barcode>
<barcode type="code39">ABCDE</barcode>
<barcode type="itf">012345</barcode>
<barcode type="codabar">A012345A</barcode>
<barcode type="code93">ABCDE</barcode>
<barcode type="code128">{Babcde</barcode>
<barcode type="gs1_128">>(01)2012345678890*</barcode>
<barcode type="gs1_databar_omnidirectional">02012345678890</barcode>
<barcode type="gs1_databar_truncated">02012345678890</barcode>
<barcode type="gs1_databar_limited">02012345678890</barcode>
<barcode type="gs1_databar_expanded">>(01)2012345678903</barcode>
```

FIG. 38J

| Type | Description |
|---|---|
| PDF417 | Convert the character string to the string in UTF-8, apply the escape sequence, and then encode the string.<br><br>The data area can contain up to 928 code words in a maximum of 90 rows, each of which can contain up to 30 code words. |
| QR Code | Convert the character string to the string in Shift-JIS, apply the escape sequence, and then encode the string based on the data type as shown below.<br>Number: 0 to 9<br>Alphanumeric character:<br>0 to 9, A to Z, space, $, %, *, +, -, ., /, :<br>Kanji character: Shift-JIS value<br>8-bit, byte data:<br>        0x00 to 0xff |

FIG. 39A

| Type | Description |
|---|---|
| MaxiCode | Convert the character string to the string in UTF-8, apply the escape sequence, and then encode the string.<br><br>In Modes 2 and 3, when the first piece of data is [)>\ x1e01\x1dyy (where yy is a two-digit number), this is processed as the message header, and the subsequent data is processed as the primary message. In other cases, from the first piece of data, data is processed as the primary message.<br><br>Specify the primary message in the following format:<br><br>• In Mode 2<br>Postal code (1- to 9-digit number)<br>GS:(\x1d)<br>ISO country code (1- to 3-digit number)<br>GS:(\x1d)<br>Service class code (1- to 3-digit number)<br><br>• In Mode 3<br>Postal code (1 to 6 pieces of data convertible by Code Set A)<br>GS:(\x1d)<br>ISO country code (1- to 3-digit number)<br>GS:(\x1d)<br>Service class code (1- to 3-digit number) |
| GS1 DataBar Stacked<br>GS1 DataBar Stacked Omnidirectional | Convert the character string to the string in UTF-8, apply the escape sequence, and then encode the string.<br><br>Specify a 13-digit global trade item number (GTIN) not including an application identifier (AI) or a check digit. |
| GS1 DataBar Expanded Stacked | Convert the character string to the string in UTF-8, apply the escape sequence, and then encode the string.<br><br>You can enclose an application identifier (AI) in parentheses. The parentheses are used as HRI print characters and are not encoded as data.<br><br>To encode each of the following characters, specify two characters starting with the character "{":<br>FNC1:{1<br>(:{{<br>):{) |

FIG. 39B

| String | Description |
|---|---|
| \xnn | Control code |
| \\ | Back slash |

FIG. 39C

| Attribute value | Type |
|---|---|
| "pdf417_standard" | Standard PDF417 |
| "pdf417_truncated" | Truncated PDF417 |
| "qrcode_model_1" | QR Code Model 1 |
| "qrcode_model_2" | QR Code Model 2 |
| "maxicode_mode_2" | MaxiCode Mode 2 |
| "maxicode_mode_3" | MaxiCode Mode 3 |
| "maxicode_mode_4" | MaxiCode Mode 4 |
| "maxicode_mode_5" | MaxiCode Mode 5 |
| "maxicode_mode_6" | MaxiCode Mode 6 |
| "gs1_databar_stacked" | GS1 DataBar Stacked |
| "gs1_databar_stacked_omnidirectional" | GS1 DataBar Stacked Omnidirectional |
| "gs1_databar_expanded_stacked" | GS1 DataBar Expanded Stacked |

FIG. 39D

| Attribute value | Description |
|---|---|
| "level_0" | PDF417 error correction level 0 |
| "level_1" (default) | PDF417 error correction level 1 |
| "level_2" | PDF417 error correction level 2 |
| "level_3" | PDF417 error correction level 3 |
| "level_4" | PDF417 error correction level 4 |
| "level_5" | PDF417 error correction level 5 |
| "level_6" | PDF417 error correction level 6 |
| "level_7" | PDF417 error correction level 7 |
| "level_8" | PDF417 error correction level 8 |
| "level_l" | QR Code error correction level L |
| "level_m" | QR Code error correction level M |
| "level_q" | QR Code error correction level Q |
| "level_h" | QR Code error correction level H |
| "default" | Default level |

FIG. 39E

| Two-dimensional symbol | Valid value range | Default |
|---|---|---|
| PDF417 | "2" to "8" | width="3" |
| QR Code | "1" to "16" | width="3" |
| MaxiCode | Ignored | |
| GS1 DataBar | "2" to "8" | width="2" |

FIG. 39F

| Two-dimensional symbol | Valid value range | Default |
|---|---|---|
| PDF417 | "2" to "8" | height="3" |
| QR Code | Ignored | |
| MaxiCode | | |
| GS1 DataBar | | |

FIG. 39G

| Two-dimensional symbol | Default | Description |
|---|---|---|
| PDF417 | size="0" | Specifies the number of code words for each row |
| QR Code | Ignored | |
| MaxiCode | | |
| GS1 DataBar | Varies depending on the model | Specifies the maximum width for the barcode |

FIG. 39H

| Attribute value | Description |
|---|---|
| "left" (default) | Alignment to the left |
| "center" | Alignment to the center |
| "right" | Alignment to the right |

FIG. 39I

| Attribute value | Description |
|---|---|
| "true" or "1" | Specifies rotated printing of text. |
| "false" or "0" (default) | Cancels rotated printing of text. |

FIG. 39J

```
<!-- Print two-dimensional symbols -->
<symbol type="pdf417_standard">ABCDE</symbol>
<symbol type="qrcode_model_2" level="level_q">ABCDE</symbol>
<symbol type="maxicode_mode_2">908063840\x1d850\x1d001\x1d\x04</symbol>
<symbol type="gs1_databar_stacked">02012345678 90</symbol>
<symbol type="gs1_databar_stacked_omnidirectional">02012345678 90</symbol>
<symbol type="gs1_databar_expanded_stacked">(01)02012345678903</symbol>
```

FIG. 39K

| Attribute value | Description |
| --- | --- |
| "thin"(default) | Solid line: Thin |
| "medium" | Solid line: Medium |
| "thick" | Solid line: Thick |
| "thin_double" | Double line: Thin |
| "medium_double" | Double line: Medium |
| "thick_double" | Double line: Thick |

FIG. 40A

```
<!-- Draw double lines(From the left end: 100th dot to 200th dot) -->
<!--                  (From the left end: 400th dot to 500th dot) -->
   <hline x1="100" x2="200" style="thin_double" />
   <hline x1="400" x2="500" style="thin_double" />
```

FIG. 40B

| Attribute value | Description |
|---|---|
| "thin"(default) | Solid line: Thin |
| "medium" | Solid line: Medium |
| "thick" | Solid line: Thick |
| "thin_double" | Double line: Thin |
| "medium_double" | Double line: Medium |
| "thick_double" | Double line: Thick |

FIG. 41A

```
<!-- Draw thin lines from 100th to 200th dot from the left end -->
    <vline-begin x="100" />
    <vline-begin x="200" />
    <feed unit="100" />
    <vline-end x="100" />
    <vline-end x="200" />
```

FIG. 41B

| Attribute value | Description |
|---|---|
| "thin"(default) | Solid line: Thin |
| "medium" | Solid line: Medium |
| "thick" | Solid line: Thick |
| "thin_double" | Double line: Thin |
| "medium_double" | Double line: Medium |
| "thick_double" | Double line: Thick |

FIG. 42A

```
<!-- Draw thin lines from 100th to 200th dot from the left end -->
    <vline-begin x="100" />
    <vline-begin x="200" />
    <feed unit="100" />
    <vline-end x="100" />
    <vline-end x="200" />
```

FIG. 42B

| Element | Description |
| --- | --- |
| <text> | Prints text |
| <feed> | Paper feed |
| <image> | Prints a raster image |
| <logo> | Prints a NV logo |
| <barcode> | Prints a barcode |
| <symbol> | Prints a two-dimensional symbol |
| <area> | Sets a print area |
| <direction> | Sets a print direction |
| <position> | Sets a print position |
| <line> | Draws a line |
| <rectangle> | Draws a rectangle |
| <command> | Inserts a command |

FIG. 43A

```
<!-- Print "ABCDE" in page mode -->

<text>ABCDE</text>

```
<!-- Print the characters "ABCDE" by specifying the print area as origin (100, 50),
     width: 200 dots, and height: 30 dots -->

<area x="100" y="50" width="200" height="30" />
  <text>ABCDE</text>

```

| Attribute value | Description |
|---|---|
| "left_to_right" (default) | Left to right<br>(No rotation. Data is printed from the top left corner to the right.) |
| "bottom_to_top" | Bottom to top<br>(Counterclockwise rotation by 90 degrees.<br>Data is printed from the bottom left corner to the top.) |
| "right_to_left" | Right to left<br>(Rotation by 180 degrees. Data is printed from the bottom right corner to the left.) |
| "top_to_bottom" | Top to bottom<br>(Clockwise rotation by 90 degrees.<br>Data is printed from the top right corner to the bottom.) |

FIG. 45A

```
<!-- Print the characters "ABCDE" by rotating them 90 degrees clockwise -->

<direction dir="top_to_bottom" />
   <text>ABCDE</text>

```
<!-- Specify (50,30) for the print start position in the area specified
 by the addPageArea method and print the characters "ABCDE" -->

<area x="100" y="50" width="200" height="100" />
   <position x="50" y="30" />
   <text>ABCDE</text>

| Attribute value | Description |
|---|---|
| "thin" (default) | Solid line: Thin |
| "medium" | Solid line: Medium |
| "thick" | Solid line: Thick |
| "thin_double" | Double line: Thin |
| "medium_double" | Double line: Medium |
| "thick_double" | Double line: Thick |

FIG. 47A

```
<!-- Draw a thin solid line between the start position
(100, 0) and the end position (500, 0) -->

<line x1="100" y1="0" x2="500" y2="0" style="thin" />

| Attribute value | Description |
|---|---|
| "thin" (default) | Solid line: Thin |
| "medium" | Solid line: Medium |
| "thick" | Solid line: Thick |
| "thin_double" | Double line: Thin |
| "medium_double" | Double line: Medium |
| "thick_double" | Double line: Thick |

FIG. 48A

```
<!-- Draw a rectangle with a thin double line, with the start position
(100, 0) and the end position (500, 200) as its vertexes -->

<rectangle x1="100" y1="0" x2="500" y2="200" style="thin-double" />

| Attribute value | Description |
|---|---|
| "no_feed" | Cut without feeding<br>(The paper is cut without being fed.) |
| "feed" (default) | Feed cut<br>(The paper is fed to the cut position and then is cut.) |
| "reserve" | Cut reservation<br>(Printing continues until the cut position is reached, at which the paper is cut.) |

FIG. 49A

```
<!-- Perform feed cut operation -->
    <cut type="feed" />
```

FIG. 49B

| Attribute value | Description |
|---|---|
| "drawer_1" (default) | Pin 2 of the drawer kick-out connector |
| "drawer_2" | Pin 5 of the drawer kick-out connector |

FIG. 50A

| Attribute value | Description |
|---|---|
| "pulse_100" (default) | 100 ms |
| "pulse_200" | 200 ms |
| "pulse_300" | 300 ms |
| "pulse_400" | 400 ms |
| "pulse_500" | 500 ms |

FIG. 50B

```
<!-- Send a 100msec pulse signal to the pin 2 of the drawer kick connector -->
<pulse drawer="drawer_1" time="pulse_100" />
```

FIG. 50C

| Attribute value | Description |
|---|---|
| "none" | Stop |
| "pattern_a" (default) | Pattern A |
| "pattern_b" | Pattern B |
| "pattern_c" | Pattern C |
| "pattern_d" | Pattern D |
| "pattern_e" | Pattern E |
| "error" | Error sound pattern |
| "paper_end" | Pattern when there is no paper |

FIG. 51A

| Attribute value | Description |
|---|---|
| "0" | The buzzer does not stop. |
| "1" to "255" | Number of repeats |

FIG. 51B

```
<!-- Repeat the sound pattern A three times -->
   <sound pattern="pattern_a" repeat="3" />
```

FIG. 51C

| Sub-element | Data type | Description |
|---|---|---|
| timeout | int | Sets the time out limit for requests in milliseconds. 1,000 to 60,000 (whole numbers) |
| displaydata | string | Specifies the customer display control XML. For details, refer to Customer Display Control XML. |

FIG. 52A

```
<data>
 <type>display</type>
 <timeout>10000</timeout>
 <displaydata>
    <!-- Customer display control XML -->
    <epos-display xmlns=
         .
         .
    </epos-display>
 </displaydata>
</data>
```

FIG. 52B

| Sub-element | Data type | Description |
|---|---|---|
| resultdata | stringt | Receives the response from the data sent to the customer display. For details, refer to <response>. |

FIG. 53A

```
<data>
 <type>onxmlresult</type>
 <resultdata>
  <response success="true" code="" status=""/>
 </resultdata>
</data>
```

FIG. 53B

| Sub-element | Function |
|---|---|
| <window> | Window settings |
| <text> | Character display |
| <cursor> | Cursor display |
| <blink> | Settings for screen blinking |
| <brightness> | Settings for display brightness |
| <marquee> | Settings for character string marquees |
| <clock> | Time display |
| <clear> | Clears the current window display |
| <reset> | Resets the display |
| <command> | Executes the ESC/POS command |

FIG. 54A

```
<!-- Example with a text tag added as a sub-element -->
<epos-display xmlns="http://www.epson-pos.com/schemas/2012/09/epos-display">
  <text>Hello world!!</text>
</epos-display>
```

FIG. 54B

| Attribute value | Description |
|---|---|
| "true" or "1" | Successfully displayed |
| "false" or "0" | Failed to display |

FIG. 55A

| Attribute value | Description |
|---|---|
| "EDSP_NOT_FOUND" | Could not find the error code |
| "EDSP_NOT_OPEN" | Failed to open the device |
| "EDSP_INVALID_WINDOW" | An unregistered window was designated |
| "EDSP_SYSTEM_ERROR" | An unexpected error occurred |
| "EDSP_SCHEMA_ERROR" | The XML structure is invalid |
| "EX_BADPORT" | An error occurred in internal communication error with the device |
| "EX_TIMEOUT" | A time-out error occurred in communication with the device |
| "EX_INVALID_VALUE" | Detected an invalid parameter |

FIG. 55B

```
<!-- Successfully performed. -->
<response success="true" code="" status=""/>
<!-- Failed -->
<response success="false" code="EDSP_NOT_FOUND" status=""/>
```

FIG. 55C

| Attribute value | Description |
|---|---|
| "1" | Window 1 |
| "2" | Window 2 |
| "3" | Window 3 |
| "4" | Window 4 |

FIG. 56

| Attribute value | Description |
|---|---|
| "overwrite" (Default) | When characters are displayed while the display position is at the upper right end, the display position moves to the lower left end. When characters are displayed while the display position is at the lower right end, the position moves to the upper left end. |
| "v_scroll" | When characters are displayed while the display position is at the upper right end, the display position moves to the lower left end. When characters are displayed while the display position is at the lower right end, the characters already displayed in the lower row are scrolled to the upper row and the lower row is cleared. |
| "h_scroll" | When characters are displayed while the display position is at the right end, all the characters already displayed in the row where the cursor exists are scrolled one character to the left and a new character is displayed at the right end. |

FIG. 57A

| Attribute value | Description |
|---|---|
| "true" or "1" | Executes deletion |
| "false" or "0" (Default) | Does not execute deletion |

FIG. 57B

| Error value | Description |
|---|---|
| "EX_INVALID_VALUE" | When creating a window and the x, y, width, or height overlaps with an already defined window |
| "EDSP_INVALID_WINDOW" | When moving a window and the designated window does not exist |

FIG. 57C

```
<!-- Define window 1 from the top left with width 10, height 2, vertical scroll -->
<window number="1" x="1" y="1" width="10" height="2" scrollmode="v_scroll"/>
<!-- Define window 2 from the center with width 10, height 2, vertical scroll -->
<window number="2" x="11" y="1" width="10" height="2" scrollmode="v_scroll"/>
<!-- Move the current window to window 1 -->
<window number="1"/>
<!-- Delete window 2 -->
<window number="2" destroy="true"/>
```

FIG. 57D

| Attribute value | Description |
|---|---|
| "true" or "1" | Performs shading |
| "false" or "0" (Default) | Does not perform shading |

FIG. 58A

| Attribute value | Description |
|---|---|
| "en" (Default) | English |
| "ja" | Japanese |

FIG. 58B

```
<!-- Display character strings from top left -->
 <text  x="1" y="1" lang="ja">Carrots \100</text>
<!-- Display shaded character strings from the current cursor position -->
 <text reverse="true">Welcome!!</text>
```

```
<!-- Change the current window to window 2 -->
<window number="2"/>
<text x="1" y="1" lang="ja"> Carrots, $1</text>
```

FIG. 58C

| Attribute value | Description |
|---|---|
| "top_left" | Moves to the top left |
| "top_right" | Moves to the top right |
| "bottom_left" | Moves to the bottom left |
| "bottom_right" | Moves to the bottom right |

FIG. 59A

| Attribute value | Description |
|---|---|
| "none" | Does not display the cursor |
| "underline" | Displays using an underline format |

FIG. 59B

```
<!-- Move the cursor to the top left of the display -->
<cursor x="1" y="1"/>
<!-- Move the cursor to the top left of the current window -->
<cursor moveto="top_left" type="underline"/>
```

FIG. 59C

| Attribute value | Description |
| --- | --- |
| "0" | Terminates blinking and sets display to be continuously on |
| "1" to "12700" | Milliseconds for blinking interval |
| "12701" to "12750" | Turns off display, maintaining displayed contents |

FIG. 60A

```
<!-- Set screen blinking interval to 500 ms -->
 <blink interval="500"/>
<!-- Clear screen blinking -->
 <blink interval="0"/>
<!-- Turn off screen. Maintain displayed contents -->
 <blink interval="12750"/>
 <cursor moveto="top_left" type="underline"/>
```

FIG. 60B

| Attribute value | Description |
| --- | --- |
| "20" | Brightness 20% |
| "40" | Brightness 40% |
| "60" | Brightness 60% |
| "100" | Brightness 100% |

FIG. 61A

```
<!-- Set brightness to 20% -->
 <brightness value="20"/>
<!-- Set brightness to 40% -->
 <brightness value="40"/>
<!-- Set brightness to 60% -->
 <brightness value="60"/>
<!-- Set brightness to 100% -->
 <brightness value="100"/>
```

FIG. 61B

| Attribute value | Description |
|---|---|
| "walk" (Default) | Displays the string from the right end of the window. |
| "place" | Displays the string from the left end of the window. |

FIG. 62A

| Attribute value | Description |
|---|---|
| "0" (Default) | Repeats indefinitely |
| "1" to "127"(whole number) | Repeats the designated number of times |

FIG. 62B

| Attribute value | Description |
|---|---|
| "0" to "2000"(whole number) | Wait interval for each character display |

FIG. 62C

| Attribute value | Description |
|---|---|
| "100" to "2000"(whole number) | Wait period for after displaying the end of the character string |

FIG. 62D

| Attribute value | Description |
|---|---|
| "en" (Default) | English |
| "ja" | Japanese |

FIG. 62E

```
<!-- Display marquee from right of the screen at 200 ms/character, repeat at 1000 ms intervals -->
  <marquee uwait="200" rwait="1000">Welcome</marquee>
<!-- Display marquee from left of the screen at 200 ms/character, repeat at 1000 ms intervals -->
  <marquee uwait="200" rwait="1000" format="place">Welcome!!</marquee>
```

FIG. 62F

`<clock/>`

FIG. 63

`<clear/>`

FIG. 64

`<reset/>`

FIG. 65

`<command>01025AEF3B405C</command>`

FIG. 66

| Sub-element | Data type | Description |
|---|---|---|
| keycode | int | Receives the key code decimals input with the POS keyboard. For key code details, refer to the List of KeyCode |
| ascii | string | Receives the characters created by key codes. Characters converted into symbols and capital letters from holding down the shift key are set. |

FIG. 67A

| Character string before replacement | After replacement |
|---|---|
| & (Ampersand) | & |
| > (Greater-than symbol) | > |
| < (Lesser-than symbol) | < |
| "(Double quotation mark) | " |
| ' (Single quotation mark) | ' |

FIG. 67B

```
<data>
 <type>onkeypress</type>
 <keycode>49</keycode>
 <ascii>a</ascii>
</data>
```

FIG. 67C

| Sub-element | Data type | Description |
|---|---|---|
| keycode | int | Designates the key code decimals to determine the start of the character string.<br>For key code details, refer to the List of KeyCode. |

FIG. 68A

```
<data>
 <type>setprefix</type>
 <keycodes array="true">49</keycodes>
 <keycodes>50</keycodes>
 <keycodes>51</keycodes>
 <keycodes>52</keycodes>
</data>
```

FIG. 68B

| Sub-element | Data type | Description |
|---|---|---|
| input | string | Receives the input character strings.<br>Does not include the key to determine the start of the character string or the Enter key. |
| prefix | int | Receives the key code that determined the start of the character string.<br>For key code details, refer to the List of KeyCode. |

FIG. 69A

| Character string before replacement | After replacement |
|---|---|
| & (Ampersand) | & |
| > (Greater-than symbol) | > |
| < (Lesser-than symbol) | < |
| "(Double quotation mark) | " |
| ' (Single quotation mark) | ' |

FIG. 69B

```
<data>
 <type>onstring</type>
 <input>&2398749238429</input>
 <prefix>49</prefix>
</data>
```

FIG. 69C

| Sub-element | Data type | Description |
|---|---|---|
| commandstring | string | Hexadecimal expressed character string for the command string |

FIG. 70A

```
<data>
 <type>sendcommand</type>
  <command>1B123344FF1F5D3C</command>
</data>
```

FIG. 70B

| Sub-element | Data type | Description |
|---|---|---|
| statusstring | string | Data reception status<br>For details, refer to the status below. |
| data | string | Hexadecimal expressed character string for the data string |

FIG. 71A

| Element value | Description |
|---|---|
| "SUCCESS" | Successfully received data |

FIG. 71B

```
<data>
 <type>oncommandreply</type>
  <status>SUCCESS</status>
  <data>1B123344FF1F5D3C</data>
</data>
```

FIG. 71C

| Object | Description |
|---|---|
| ClientConnection | Object used to send data to a device object on the application. |
| DeviceConnection | Object used to send/receive data to/from the device. |

FIG. 73

| Set value | Description |
|---|---|
| type_keyboard | Specify this to use a keyboard device. |
| type_scanner | Specify this to use a barcode scanner. |
| type_simple_serial | Specify this to perform simple serial communication. |

FIG. 74

| Set value | Description |
|---|---|
| group_hid | Specify this to use an input device that can run with an HID driver. |
| group_serial | Specify this to use a serial communication device. |
| group_other | Specify thisto use other device. |

FIG. 75

```
exports.Keyboard_Generic = Keyboard_Generic;              // Exports declaration function Keyboard_Generic(clientConn, deviceConn){        // Having two arguments
                                                          //    and the same name as the
                                                          //    file name
    this.DEVICE_TYPE = 'type_keyboard';                   // Having the
                                                          //    "DEVICE_TYPE" property
    this.DEVICE_GROUP = 'group_hid';                      // Having the
                                                          //    "DEVICE_GROUP" property
    this.clientConn = clientConn;
    this.deviceConn = deviceConn;
    .......
    .......
}

Keyboard_Generic.prototype = {
    onDeviceData : function(event, keycode, ascii){...},  // Having the
                                                          //    "onDeviceData" method
                                                          // Having the method
                                                          //    corresponding to the
                                                          //    device object
    setprefix : function(data){...}
}
```

FIG. 76

| Element | API | Description |
|---|---|---|
| Method | | |
| | send | Sends data to a device object that can run with a browser. |

FIG. 77

| Element | API | Description |
|---|---|---|
| Method | | |
| | send | Sends data to a serial communication device. |

FIG. 78

| Element | API | Description |
|---|---|---|
| Event | | |
| | onDeviceData | Key input receipt event |
| | onDeviceData | Data receipt event from a serial communication device |
| | Any event | API execution result receipt event of a device object that runs with a browser |

FIG. 79

```
data = {'keycode' : 49, 'ascii' : '1'};
clientConn.send('onkeypress', data)
```

FIG. 80

| Value | Description |
|---|---|
| 1 | Key down |
| 2 | Key up |

FIG. 81

| Item | Setting values |
|---|---|
| Device ID | local_scanner |
| Device name | Select the applicable device from the list. |
| Control Script | Scanner_Generic.js |

POINT-OF-SALE PRINTER INTERPRETING A MARKUP LANGUAGE FROM A CLIENT DEVICE TO CONTROL A SCANNER USING SCANNER-CONTROL COMMANDS

CROSS-REFERENCE TO RELATED APPLICATIONS

This application is a continuation of, and claims priority under 35 U.S.C. § 120 on, application Ser. No. 14/984,029, filed Dec. 30, 2015, which is a continuation of application Ser. No. 14/140,301, filed Dec. 24, 2013, now U.S. Pat. No. 9,280,305, which claims priority under 35 U.S.C. § 119(e) on provisional application No. 61/748,232, filed Jan. 2, 2013. The content of each such related application is incorporated by reference herein in its entirety.

TECHNICAL FIELD

The present invention relates to a device control system that controls a device, and a control method of the device control system.

BACKGROUND

A device (such as a computer) used as a controller for controlling devices is conventionally part of a system that controls devices such as a keyboard and barcode scanner by means of a terminal connected to a network.

CITATION LIST

Patent Literature

[PTL 1] JP-A-2004-152256

SUMMARY OF INVENTION

Technical Problem

However, there is also a need to use devices such as above by means of a simple configuration.

The present invention is directed to the foregoing problem, and an object of the invention is to provide a device control system, a terminal, and a control method of a device control system that can control devices by a terminal connected to a network.

Solution to Problem

To achieve the foregoing object, a device control system according to the invention has a device configured to input or output data; a terminal configured to run an application, to send a request in markup language and to receive a response in markup language; and a device control device configured to connect to the device, to control the device based on the markup language request, and to send the markup language response.

The invention enables controlling devices connected to the device control device by a terminal connected to a network. The terminal can be any device that can run an application that generates data written in XML. Because XML is highly versatile, many different devices can be used as the terminal. Developing applications for the terminal is also simple.

In addition, the response includes data denoting the result of controlling the device.

The application also sends to the device control device the request including an establish communication message requesting establishing a communication link to the device control device; and when the request including the establish communication message is received, the device control device sends to the application the response including a response message to the establish communication message contained in the request.

The application also establishes a communication link with the device control device based on a response message to the establish communication message contained in the response sent by the device control device.

After the communication link is established, the application also sends to the device control device the request including an open message to open communication to the device connected to the device control device to the device control device.

When the request containing the open message is received, the device control device sends to the application the response including a response message to the open message contained in the request.

The application also receives the response containing a response message to the open message sent by the device control device, and based on a response message to the open message becomes able to communicate with the device.

After communication with the device is enabled, the application also sends to the device control device the request including a close message to close communication with the device.

The device control device also receives the request containing the close message, and sends to the application the response containing a response message to the close message.

In addition, the application receives the response containing a response message to the close message sent by the device control device, and closes communication with the device based on a response message to the close message.

Another aspect of the invention is a control method of a device control system including a device configured to input or output data, a terminal configured to run an application, and a device control device configured to connect to the device, comprising: sending a markup language request generated by the application to the device control device; and receiving the request by the device control device; generating a response in the markup language; and sending the generated response to the terminal.

The control method of a device control system also includes, sending information contained in the request to the device by the device control device; executing a process based on information contained in the request by the device, and sending a result processed based on information contained in the request to the device control device; and sending to the terminal the response including a result processed based on information contained in the request sent by the device.

The control method of a device control system also includes the application sending to the device control device the request including an establish communication message requesting establishing a communication link to the device control device; and when the request including the establish communication message is received, the device control device sending to the application the response including a response message to the establish communication message contained in the request.

In addition, the application establishes a communication link with the device control device based on a response message to the establish communication message contained in the response sent by the device control device.

In addition, after the communication link is established, the application sends to the device control device the request including an open message to open communication to the device connected to the device control device to the device control device.

In addition, when the request containing the open message is received, the device control device sends to the application the response including a response message to the open message contained in the request.

In addition, the application receives the response containing a response message to the open message sent by the device control device; and based on a response message to the open message becomes able to communicate with the device.

In addition, the application sends to the device control device the request including a close message to close communication with the device when stopping the application after communication between the application and the device is enabled.

In addition, the device control device receives the request containing the close message, and sends to the application the response containing a response message to the close message.

In addition, the application receives the response containing a response message to the close message sent by the device control device, and closes communication with the device based on a response message to the close message.

Objects of the present invention are also met in a printer for a point-of-sale (POS) system. The printer includes: a connector configured to connect to a device responsive to device-control commands; a communication interface configured to communicate with a terminal, to receive a markup language request from the terminal, and to send a markup language response to the terminal; a controller configured to interpret the markup language request received from the terminal, and to control the device using appropriate device-control commands to execute the interpreted markup language request, the printer being further configured to encode any response from the device as a markup language response and to send the markup language response to the terminal; wherein the device-control commands are not a markup language.

Preferably, the markup language response includes data denoting a result of device control.

Additionally, the printer may also receive, from the terminal, an establish communication markup language request to establishment a communication link with the printer. In this case, the printer may send, to the terminal, a markup language response to the establish communication markup language request.

Further preferably, in response to the printer receiving from the terminal an open markup language request to open communication with the device connected to the printer, the printer sends to the terminal a markup language response to the open markup language request indicating whether a communication link with the device is established.

Furthermore, in response to the printer receiving from the terminal a close markup language request to close communication with the device, the printer sends to the terminal a markup language response to the close markup language request indicating whether communication with the device is closed.

In the above, the communication interface is preferably a computer network interface.

The above objects are also met in a point-of-sale printer for a point-of-sale (POS) system, the point-of-sale printer including: a first connector configured to connect to a scanner responsive to scanner-control commands, the scanner being external to the point-of-sale printer; a second connector configured to communicate with a terminal, to receive a markup language request from the terminal, and to send a markup language response to the terminal, the terminal being external to the point-of-sale printer; a controller configured to interpret the markup language request received from the terminal, and to control the scanner using the scanner-control commands to execute the interpreted markup language request; wherein the controller encodes scanned data from the scanner as a markup language response and to send the markup language response to the terminal, the markup language response including a type element of the scanner and a sub-element of the scanned data.

Preferably, the markup language response includes data denoting a result of scanner control.

It if further preferred that the point-of-sale printer receives from the terminal an establish communication markup language request to establish a communication link with the point-of-sale printer, the point-of-sale printer sends to the terminal a markup language response to the establish communication markup language request.

Additionally, in response to the point-of-sale printer receiving from the terminal an open markup language request to open communication with the scanner connected to the point-of-sale printer, the point-of-sale printer sends to the terminal a markup language response to the open markup language request indicating whether a communication link with the scanner is established, as a result of scanner control.

Further additionally, in response to the point-of-sale printer receiving from the terminal a close markup language request to close communication with the scanner, the point-of-sale printer sends to the terminal a markup language response to the close markup language request indicating whether communication with the scanner is closed, as a result of scanner control.

In an embodiment of the present invention, the scanner-control commands are not a markup language.

In a preferred embodiment, the first connector is a USB interface.

Additionally, the second connector may be part of a computer network interface to connect with the terminal over a computer network.

BRIEF DESCRIPTION OF DRAWINGS

FIG. 3A shows a list of key codes that can be acquired from a keyboard.

FIG. 3B shows a list of key codes that can be acquired from a keyboard.

FIG. 10 shows a method of registering a controlled device.
FIG. 11 shows a list of the types of registered devices.
FIG. 12 illustrates registration of a device.
FIG. 13 illustrates registration of a device.
FIG. 14 illustrates registration of a device.
FIG. 15 illustrates registration of a device.
FIG. 16 illustrates registration of a device.
FIG. 20A shows an example of communication data.
FIG. 20B shows an example of communication data.
FIG. 21 shows an example of the array of elements in a message.
FIG. 22 shows messages.
FIG. 23 shows message data for each device.
FIG. 24A illustrates an <admin_info> message.
FIG. 24B illustrates an <admin_info> message.
FIG. 24C illustrates an <admin_info> message.
FIG. 24D illustrates an <admin_info> message.
FIG. 24E illustrates an <admin_info> message.
FIG. 25A illustrates an <open_device> message.
FIG. 25B illustrates an <open_device> message.
FIG. 25C illustrates an <open_device> message.
FIG. 25D illustrates an <open_device> message.
FIG. 25E illustrates an <open_device> message.
FIG. 25F illustrates an <open_device> message.
FIG. 26A illustrates a <close_device> message.
FIG. 26B illustrates a <close_device> message.
FIG. 26C illustrates a <close_device> message.
FIG. 26D illustrates a <close_device> message.
FIG. 26E illustrates a <close_device> message.
FIG. 27A illustrates a <device_data> message.
FIG. 27B illustrates a <device_data> message.
FIG. 27C illustrates a <device_data> message.
FIG. 27D illustrates a <device_data> message.
FIG. 28A illustrates an <error> message.
FIG. 28B illustrates an <error> message.
FIG. 28C illustrates an <error> message.
FIG. 29A illustrates a message for a barcode scanner.
FIG. 29B illustrates a message for a barcode scanner.
FIG. 29C illustrates a message for a barcode scanner.
FIG. 30A illustrates a message for a printer.
FIG. 30B illustrates a message for a printer.
FIG. 31A illustrates a message for a printer.
FIG. 31B illustrates a message for a printer.
FIG. 32A illustrates an XML document for printer control.
FIG. 32B illustrates an XML document for printer control.
FIG. 33A illustrates an XML document for printer control.
FIG. 33B illustrates an XML document for printer control.
FIG. 33C illustrates an XML document for printer control.
FIG. 33D illustrates an XML document for printer control.
FIG. 34A illustrates an XML document for printer control.
FIG. 34B illustrates an XML document for printer control.
FIG. 34C illustrates an XML document for printer control.
FIG. 34D illustrates an XML document for printer control.
FIG. 34E illustrates an XML document for printer control.
FIG. 34F illustrates an XML document for printer control.
FIG. 34G illustrates an XML document for printer control.
FIG. 34H illustrates an XML document for printer control.
FIG. 34I illustrates an XML document for printer control.
FIG. 34J illustrates an XML document for printer control.
FIG. 34K illustrates an XML document for printer control.
FIG. 34L illustrates an XML document for printer control.
FIG. 34M illustrates an XML document for printer control.
FIG. 34N illustrates an XML document for printer control.
FIG. 34P illustrates an XML document for printer control.
FIG. 35 illustrates an XML document for printer control.
FIG. 36A illustrates an XML document for printer control.
FIG. 36B illustrates an XML document for printer control.
FIG. 36C illustrates an XML document for printer control.
FIG. 36D illustrates an XML document for printer control.
FIG. 37A illustrates an XML document for printer control.
FIG. 37B illustrates an XML document for printer control.
FIG. 38A illustrates an XML document for printer control.
FIG. 38B illustrates an XML document for printer control.
FIG. 38C illustrates an XML document for printer control.
FIG. 38D illustrates an XML document for printer control.
FIG. 38E illustrates an XML document for printer control.
FIG. 38F illustrates an XML document for printer control.
FIG. 38G illustrates an XML document for printer control.
FIG. 38H illustrates an XML document for printer control.
FIG. 38I illustrates an XML document for printer control.
FIG. 38J illustrates an XML document for printer control.
FIG. 39A illustrates an XML document for printer control.
FIG. 39B illustrates an XML document for printer control.
FIG. 39C illustrates an XML document for printer control.
FIG. 39D illustrates an XML document for printer control.
FIG. 39E illustrates an XML document for printer control.
FIG. 39F illustrates an XML document for printer control.
FIG. 39G illustrates an XML document for printer control.
FIG. 39H illustrates an XML document for printer control.
FIG. 39I illustrates an XML document for printer control.
FIG. 39J illustrates an XML document for printer control.
FIG. 39K illustrates an XML document for printer control.
FIG. 40A illustrates an XML document for printer control.
FIG. 40B illustrates an XML document for printer control.
FIG. 41A illustrates an XML document for printer control.
FIG. 41B illustrates an XML document for printer control.
FIG. 42A illustrates an XML document for printer control.
FIG. 42B illustrates an XML document for printer control.
FIG. 43A illustrates an XML document for printer control.
FIG. 43B illustrates an XML document for printer control.
FIG. 45A illustrates an XML document for printer control.
FIG. 45B illustrates an XML document for printer control.
FIG. 46 illustrates an XML document for printer control.
FIG. 47A illustrates an XML document for printer control.
FIG. 47B illustrates an XML document for printer control.
FIG. 48A illustrates an XML document for printer control.
FIG. 48B illustrates an XML document for printer control.
FIG. 49A illustrates an XML document for printer control.
FIG. 49B illustrates an XML document for printer control.

FIG. 50A illustrates an XML document for printer control.
FIG. 50B illustrates an XML document for printer control.
FIG. 50C illustrates an XML document for printer control.
FIG. 51A illustrates an XML document for printer control.
FIG. 51B illustrates an XML document for printer control.
FIG. 51C illustrates an XML document for printer control.
FIG. 52A illustrates a message for a customer display.
FIG. 52B illustrates a message for a customer display.
FIG. 53A illustrates a message for a customer display.
FIG. 53B illustrates a message for a customer display.
FIG. 54A illustrates an XML document for customer display control.
FIG. 54B illustrates an XML document for customer display control.
FIG. 55A illustrates an XML document for customer display control.
FIG. 55B illustrates an XML document for customer display control.
FIG. 55C illustrates an XML document for customer display control.
FIG. 56 illustrates an XML document for customer display control.
FIG. 57A illustrates an XML document for customer display control.
FIG. 57B illustrates an XML document for customer display control.
FIG. 57C illustrates an XML document for customer display control.
FIG. 57D illustrates an XML document for customer display control.
FIG. 58A illustrates an XML document for customer display control.
FIG. 58B illustrates an XML document for customer display control.
FIG. 58C illustrates an XML document for customer display control.
FIG. 59A illustrates an XML document for customer display control.
FIG. 59B illustrates an XML document for customer display control.
FIG. 59C illustrates an XML document for customer display control.
FIG. 60A illustrates an XML document for customer display control.
FIG. 60B illustrates an XML document for customer display control.
FIG. 61A illustrates an XML document for customer display control.
FIG. 61B illustrates an XML document for customer display control.
FIG. 62A illustrates an XML document for customer display control.
FIG. 62B illustrates an XML document for customer display control.
FIG. 62C illustrates an XML document for customer display control.
FIG. 62D illustrates an XML document for customer display control.
FIG. 62E illustrates an XML document for customer display control.
FIG. 62F illustrates an XML document for customer display control.
FIG. 63 illustrates an XML document for customer display control.
FIG. 64 illustrates an XML document for customer display control.
FIG. 65 illustrates an XML document for customer display control.
FIG. 66 illustrates an XML document for customer display control.
FIG. 67A illustrates a message for a POS keyboard.
FIG. 67B illustrates a message for a POS keyboard.
FIG. 67C illustrates a message for a POS keyboard.
FIG. 68A illustrates a message for a POS keyboard.
FIG. 68B illustrates a message for a POS keyboard.
FIG. 69A illustrates a message for a POS keyboard.
FIG. 69B illustrates a message for a POS keyboard.
FIG. 69C illustrates a message for a POS keyboard.
FIG. 70A illustrates a message for a serial communication device.
FIG. 70B illustrates a message for a serial communication device.
FIG. 71A illustrates a message for a serial communication device.
FIG. 71B illustrates a message for a serial communication device.
FIG. 71C illustrates a message for a serial communication device.
FIG. 73 illustrates a device control script.
FIG. 74 illustrates a device control script.
FIG. 75 illustrates a device control script.
FIG. 76 illustrates a device control script.
FIG. 77 illustrates a device control script.
FIG. 78 illustrates a device control script.
FIG. 79 illustrates a device control script.
FIG. 80 illustrates a device control script.
FIG. 81 illustrates a device control script.

DESCRIPTION OF EMBODIMENTS

A preferred embodiment of the invention is described below with reference to the accompanying figures.

Figure 1:
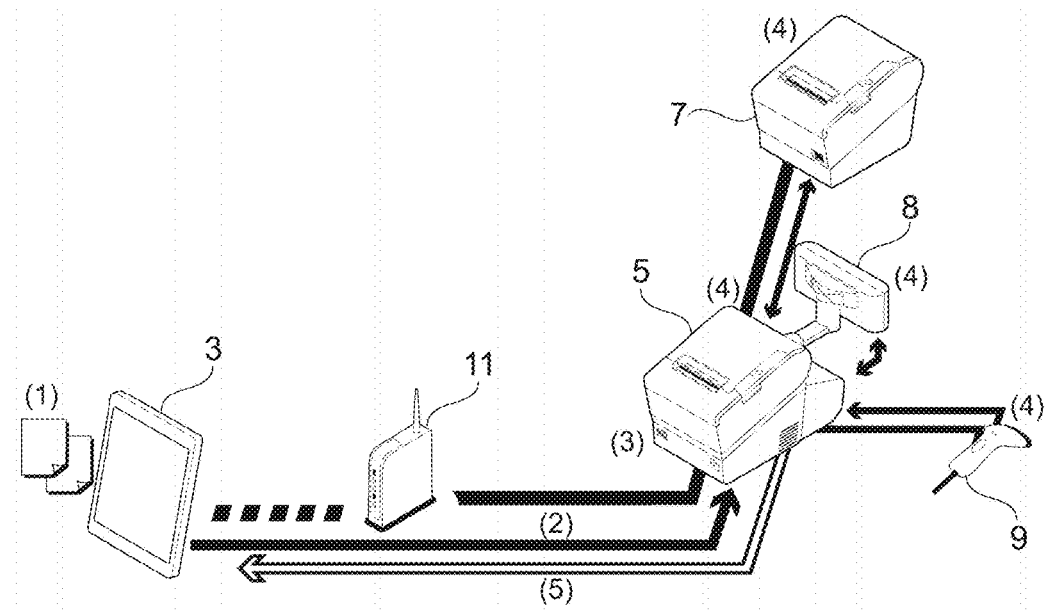
FIG. 1 illustrates a device control system according to a preferred embodiment of the invention.

FIG. 1 shows the configuration of a device control system 100 according to the invention. This device control system 100 includes a terminal 3 and a printer 5 (intelligent printer).

The terminal 3 may be any device that connects to a network and is capable of socket communication, and could be a personal computer, a smartphone, or a tablet computer, for example. The terminal 3 has an environment that is capable of socket communication and can handle XML documents, which are markup language, and uses iOS, Android, Windows, Linux, or MacOS, for example, as the OS (operating system).

The terminal 3 and printer 5 are connected over a communication network. In the example shown in FIG. 1, the device control system 100 has a wireless LAN access point 11, and the wireless LAN access point 11 is connected to the printer 5 by a cable. The terminal 3 and printer 5 communicate by a wireless connection between the terminal 3 and the wireless LAN access point 11.

A network printer 7, customer display 8, and barcode scanner 9 are connected to the printer 5 as controlled devices. The network printer 7 is connected to the printer 5 through a network. The network printer 7 is a printer separate from the local printer 55 (FIG. 2) of the printer 5, and has a wired LAN or wireless LAN interface. The customer display 8 is connected through the USB interface described below. The barcode scanner 9 is connected through the USB interface described below. These devices are generally called peripheral devices (peripherals), and are referred to below as devices. Devices that connect to the printer 5 are not limited to the devices shown in FIG. 1. For example, displays, and key input devices such as keyboards are also included. Also included are devices that can be controlled by a HID (human interface device) driver standard to the OS, serial communication devices that can be operated using a serial communication driver standard to the OS, and USB devices that can be controlled in the same way as serial communication devices.

Operation of the device control system 100 is described next.

(1) Place an application on the terminal 3.

(2) The application sends a request message to the printer 5.

(3) The printer 5 sends data to a device that can be controlled from the printer 5.

(4) The network printer and devices connected to the printer 5 are controlled.

(5) The printer 5 returns a response to the terminal 3.

Figure 2:
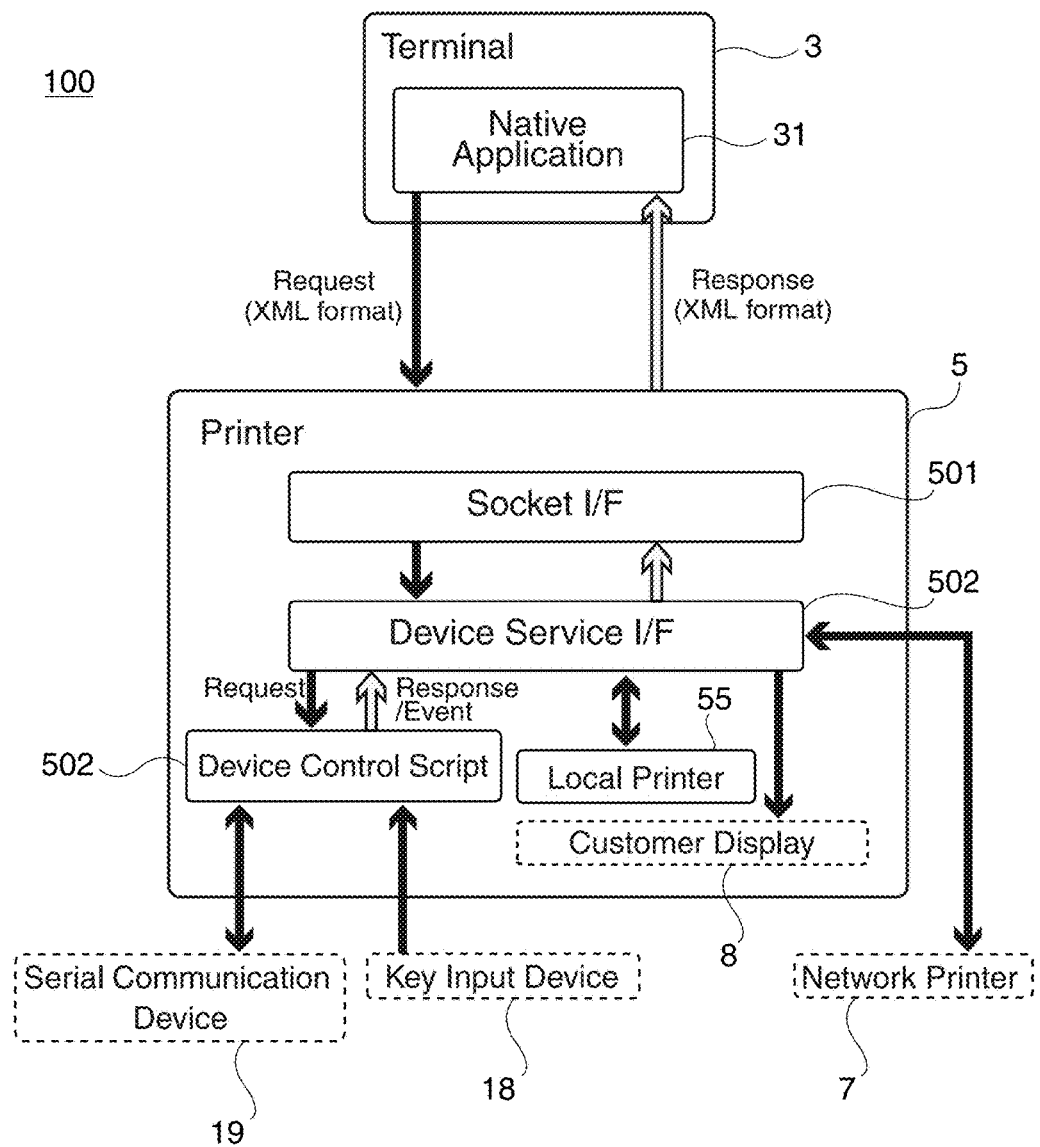
FIG. 2 shows the functional configuration of the device control system.

FIG. 2 illustrates the functional configuration of the device control system 100.

The device control system 100 uses Device XML, which is a command system written in XML markup language defining functions for controlling devices (peripheral devices) connected to the printer 5.

The terminal 3 has an application 31. The application 31 is a native application program installed on the terminal 3. The application 31, the device application programming interface (API) 33, sends an XML format request message (Request) by socket communication to the printer 5.

A device service interface 501 and a device control script 502 are built in to the printer 5. The device service interface 501 and device control script 502 interpret the request message, and output a request to the device control script 502. The device control script 502 controls a key input device 18 and serial communication device 19. The device control script 502 outputs key input device 18 and serial communication device 19 events and control result responses to the device service interface 501. The key input device 18 in this example includes the keyboard 14 in FIG. 1, and the serial communication devices 19 include the barcode scanner 9 and cash drawer 13 in FIG. 1.

The device service interface 501 exchanges data with the local printer 55. The local printer 55 is the printer incorporated in the printer 5. The device service interface 501 also exchanges data with the network printer 7 and customer display 8.

The device service interface 501 outputs an XML format response (Response) to the application 31 based on the results of controlling the network printer 7, customer display 8, and local printer 55, and device control script 502 responses.

The printer 5 thus controls devices through the device service interface 501 and device control script 502. Devices controlled in the example shown in FIG. 2 are the network printer 7, customer display 8, key input device 18, serial communication device 19, and local printer 55.

The terminal 3 can control devices connected to the printer 5 using the Device XML command system of the device control system 100 by the above operation.

Device XML has the following features.

A separate device (such as a computer) used as a controller is not needed to control devices.

Devices that operate according to a driver standard to the OS of the printer 5 can be used through the device control script 502 without installing a specific driver.

When a device is accessed, the device is exclusively locked. Multiple terminals 3 therefore cannot access and control a device at the same time. When the terminal 3 controlling a device releases the device, the device can then be controlled from another terminal 3.

The device API 33 has the following features.

Commands that print lines can be used when the network printer 7 or the local printer 55 of the printer 5 supports a line command.

Buzzer functions can be used when a buzzer is connected to the printer 5 or network printer 7.

Key codes that can be acquired from the keyboard 14 are limited. Key codes that can be acquired from the keyboard 14 are shown in FIG. 3A and FIG. 3B.

The configuration of the printer 5 is described next.

The printer 5 has a CPU, RAM, flash ROM, nonvolatile memory, a video controller, an auxiliary storage device (SSD: solid state drive), interface, and a local printer (print unit). The printer 5 could also have a speaker. The local printer is a thermal printer that can print on 80 mm wide or 58 mm wide roll paper.

The printer 5 can be installed in a POS (point of sale) system. The operating system (OS) of the printer 5 is Windows (R) based, for example, and is stored in the auxiliary storage device.

A device control program, which is software for the terminal 3 to control devices connected to the printer 5, is installed to the printer 5. As a result, installing a driver program to the terminal 3 is not necessary.

The printer 5 also has a Windows® standard device driver program (APD), UPOS driver, OPOS driver, or other software for controlling devices and the local printer of the printer 5.

A web application can be installed to the printer 5. This enables using the printer 5 as an application server as shown in FIG. 3. The web application could, for example, be a PHP and Perl server-side script or SQLite database access script (server-side script).

Figure 4:
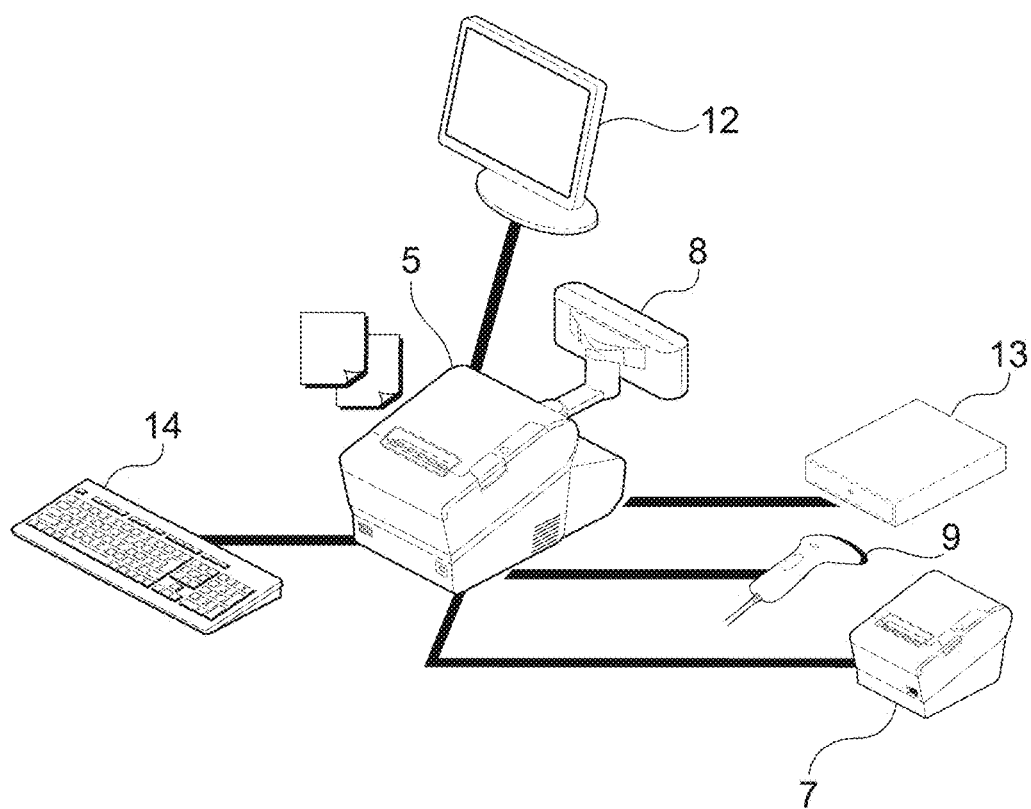
FIG. 4 shows an example of device connections to an intelligent printer.

FIG. 4 shows an example of device connections to the printer 5.

The foregoing network printer 7, customer display 8, and barcode scanner 9 can be connected to the printer 5. A display 12, cash drawer 13, and keyboard 14 can be connected to the printer 5.

Figure 5:
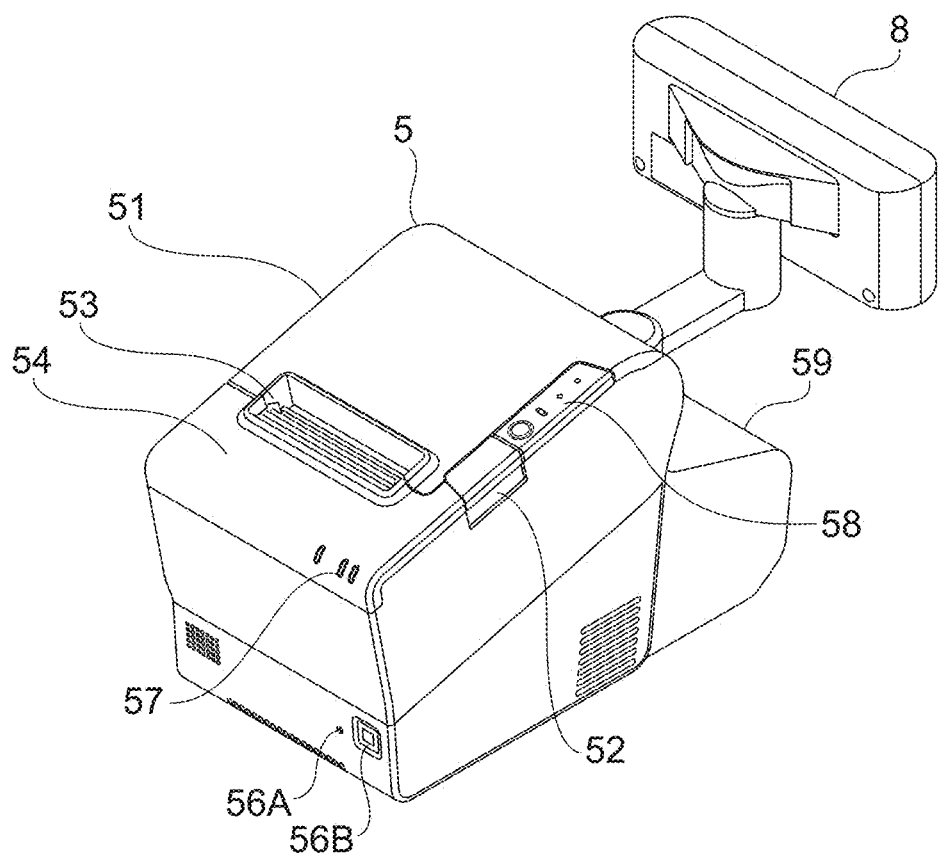
FIG. 5 is an external oblique view of an intelligent printer.

FIG. 5 shows the external appearance of the printer 5.

A roll paper cover 51 is disposed to the top of the printer 5. The roll paper cover opens when the cover open button 52 is pressed, and roll paper can be loaded. A manual cutter 53 for manually cutting the roll paper, and a cutter cover 54, are disposed to the paper exit from which the roll paper is discharged after printing. The cutter cover 54 is opened when a paper jam occurs in the local printer of the printer 5, and when the roll paper cover 51 does not open. The blade of the manual cutter 53 returns to the home position when the cutter cover 54 opens. The printer 5 also has a power switch 56B, reset button 56A, LED display unit 57, and control panel 58. The LED display unit 57 includes a disc access LED indicating accessing the auxiliary storage device, and status LEDs. The status LEDs report the operating state of the OS, the standby mode of the OS, that the power is off, the OS start-up sequence, and a high CPU temperature warning.

The control panel 58 includes a power LED, error LED, roll paper LED, and paper feed button. The power LED lights when power is supplied. The error LED is off during normal operation, and lights when the printer resets and when the end of the roll paper is detected and printing stops. The paper LED is off when sufficient roll paper remains, lights steady when little paper is left, and blinks when the self-diagnostic test is running. Pressing the feed button advances the roll paper one line at a time or continuously.

A connector cover 59 is disposed to the back of the printer 5. Removing the connector cover 59 exposes the connector panel (connection panel) on the back of the printer 5.

Figure 6:
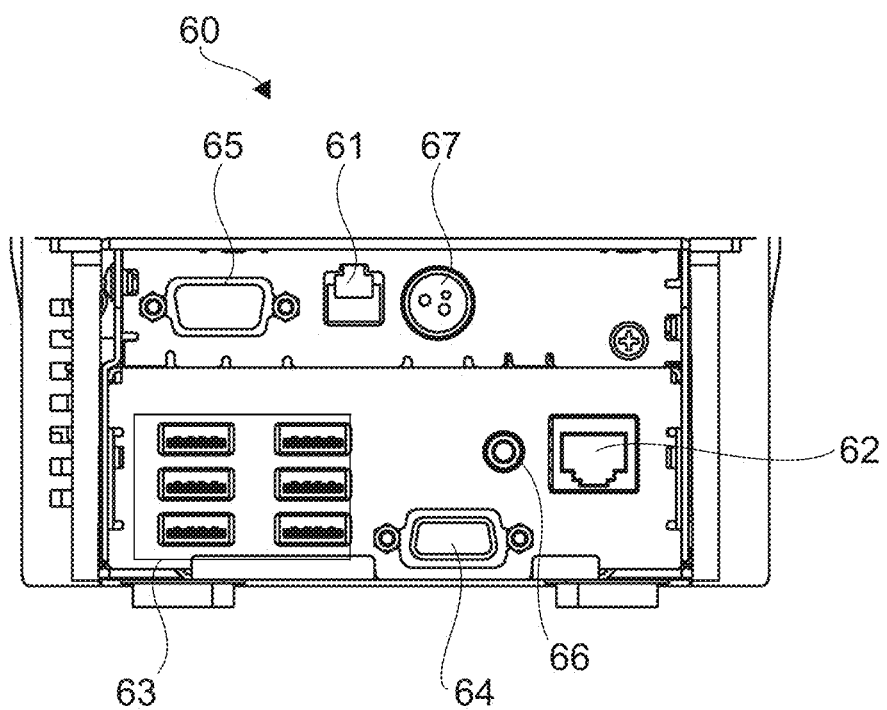
FIG. 6 shows a connector panel.

FIG. 6 shows the connection panel 60. The connection panel 60 includes a drawer kick-out connector 61, Ethernet connector 62, USB connector 63, VGA connector 64, COM connector 65, line output 66, and DC input 67. The connection panel 60 is the connection unit of the accompanying claims. However, the local printer 55 built into the printer 5 is also one of the devices connected to the printer 5. The connection unit therefore includes the connection panel 60 and an internal interface of the printer 5.

The cash drawer 13 or an optional buzzer is connected to the drawer kick-out connector 61. The Ethernet connector 62 is connected to the network. The USB connector 63 has six USB ports. The customer display 8, barcode scanner 9, keyboard 14, and other devices are connected to the USB connector 63. The display 12 is connected to the VGA connector 64. The serial interface of a serial communication device connects to the COM connector 65. The line output 66 connects to an external speaker.

Figure 7:
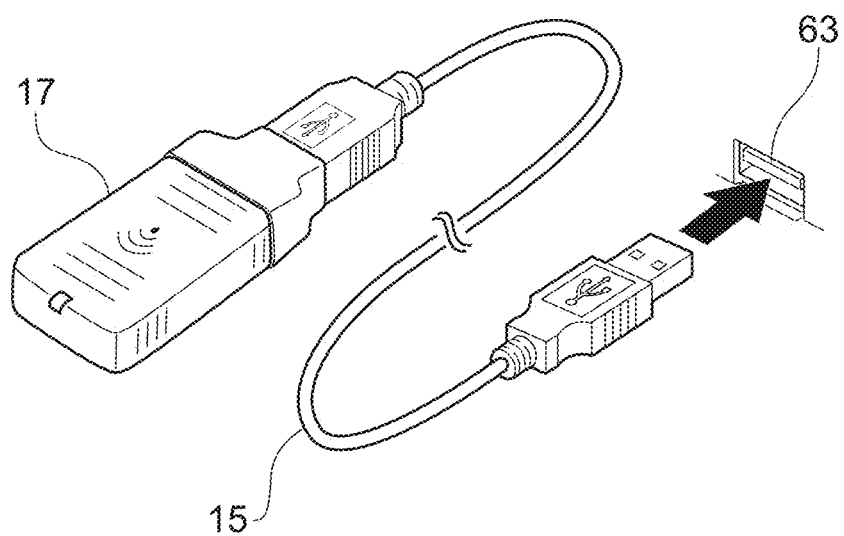
FIG. 7 shows an example of a wireless LAN unit connection.

FIG. 7 illustrates connection of a wireless LAN unit 17. The wireless LAN unit 17 plugs into a USB extension cable 15, and the USB extension cable 15 plugs into the USB connector 63. The printer 5 can thus be connected to a wireless LAN.

Building a device service interface 501 environment is described next.

Figure 8:
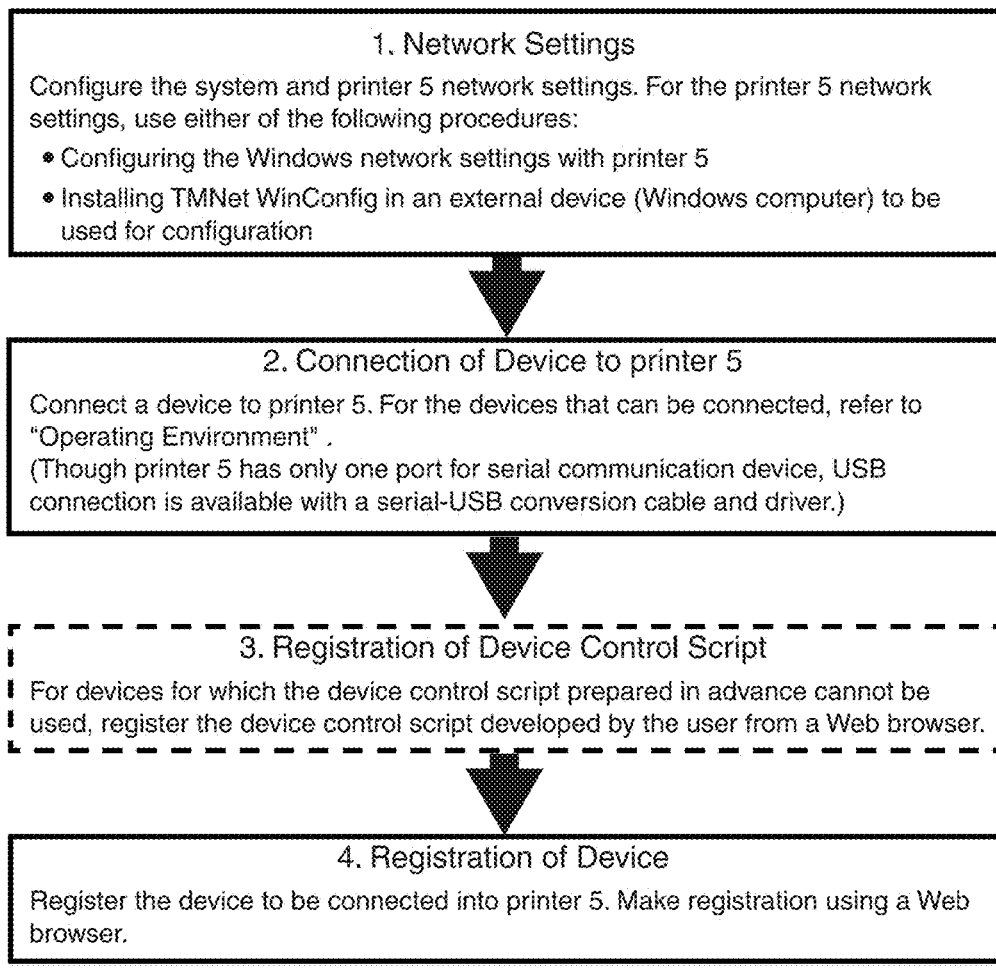
FIG. 8 shows the work flow of building a system environment.

FIG. 8 shows the flow of work when building the environment.

1. Network Settings

Configure the system and printer 5 network. The network settings of the printer 5 can be configured using any of the following methods.

Configuring the Windows (R) network settings on the printer 5.

Installing the TMNet WinConfig utility, which is an application for configuring the printer 5, on an external device (a Windows computer).

2. Connect a Device to the Printer 5

Connect a device to the printer 5. As described above, connectable devices include the customer display 8, barcode scanner 9, display 12, cash drawer 13, and keyboard 14. Also included are devices that can be controlled by a HID driver standard to the OS, serial communication devices that can be operated using a serial communication driver standard to the OS, and USB devices that can be controlled in the same way as serial communication devices. The connection panel 60 in FIG. 6 has only one COM connector 65, but plural serial communication devices can be connected if a serial-USB conversion cable is used and the driver program is compatible with serial-USB conversions.

3. Register Device Control Script

A device control script prepared by the user is registered in order for the printer 5 to control devices other than the products with which the printer 5 is compatible. Registration is done from the web browser.

4. Register Device

Register the device connected to the printer 5 in the printer 5 software. Registration is done from the web browser.

The web browser used for steps 1 to 5 includes a web browser that runs on the terminal 3.

Figure 9:
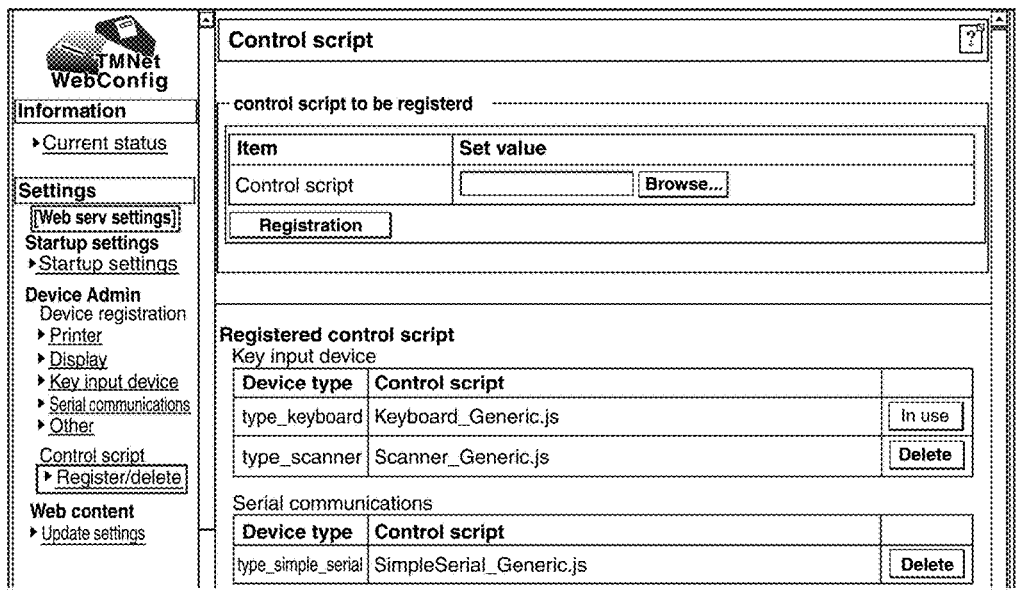
FIG. 9 shows a method of registering a device control script.

A method of registering a device control script prepared by the user is described with reference to FIG. 9.

The registration steps are as follow.

(1) Prepare a customized device control script.

(2) Turn the printer 5 power on.

(3) Start the web browser, and input the URL (http://IP address of printer 5/WebConfig/).

(4) Start the TMNetWebConfig utility. Click on [Web service settings]-[Register/delete] in the window shown in FIG. 9.

(5) The Control Script screen is displayed.

Click on [Browse] in the Control script to be registered field, and select the device control script to register.

(6) Click [Registration].

The device control script is registered and listed in the Registered control scripts field in the bottom of the window.

Register a device to be controlled by Device XML. A device is registered by the web browser displaying the TMNetWebConfig utility as shown in FIG. 10.

The registration steps are as follow.

(1) Start the web browser, and input the URL (http://IP address of printer 5/WebConfig/).

(2) The TMNetWebConfig utility starts. From [Web service settings]-[Device registration] in the window shown in FIG. 10, click on the type of device to register. Devices are displayed under Device registration in the screen shown in FIG. 10. Click on the type of device to register. The type of device in this embodiment can be selected from five types, printer, display, key input device, serial communication device, and other as shown in FIG. 11. Details about the types of devices are as shown in FIG. 11.

(3) A configuration screen is displayed for each device. The connected device is registered in the printer 5.

(3-1) To register a printer

Confirm registration of the local printer incorporated in the printer 5 as follows.

(3-1-1) Check that "printer 5" is registered for the device ID "local_printer" in the Registered Printer field in the screen shown in FIG. 10.

(3-1-2) Click on [Test printing]. Check that TEST_PRINT is printed by the local printer 55.

(3-1-3) Register the Connected Network Printer 7.

Register the network printer 7 by the following steps.

(3-1-3-1) Set the items shown in FIG. 12 (device ID, type, model number, IP address, retry interval), and click [Registration].

(3-1-3-2) After confirming the printer is added to the Registered Printer list, click [Test printing]. Confirm that TEST_PRINT is printed by the registered network printer 7.

(3-2) To register a display (customer display 8)

The device ID of the customer display is a constant, "local_display". Register the connected customer display 8 by the following steps.

(3-2-1) Select "Use" in the screen shown in FIG. 10.

(3-2-2) Set the items (communication settings, brightness settings) in FIG. 13, and click [Registration].

(3-2-3) Click [Test display]. Confirm that text is displayed on the customer display 8.

(3-3) To Register a Key Input Device 18

Register the connected key input device 18 by the following steps.

(3-3-1) Set the items (device ID, device name, control script) in FIG. 14, and click [Registration].

(3-3-2) After confirming the registered device was added to the Registered Key Input Device field, click [Operating test].

(3-3-3) A screen will be displayed by the web browser. Operate the key input device 18, and confirm that the result is displayed as operated.

(3-4) To register a serial communication device 19

Register the connected serial communication device 19 by the following steps.

(3-4-1) Set the items (device ID, device name, control script, communication speed, data bit, parity, stop bit, free control) shown in FIG. 15 for the connected serial communication device 19, and click [Registration].

(3-4-2) Confirm that the device is added to the Registered Serial Communication Device field.

(3-5) To register another device

Register another connected device by the following steps.

(3-5-1) Set the items (device ID, control script) shown in FIG. 16 for the connected device, and click [Registration].

(3-5-2) Confirm that the device is added to the Registered Other Devices field.

The programming method for developing an application using Device XML is described next.

Figure 17:
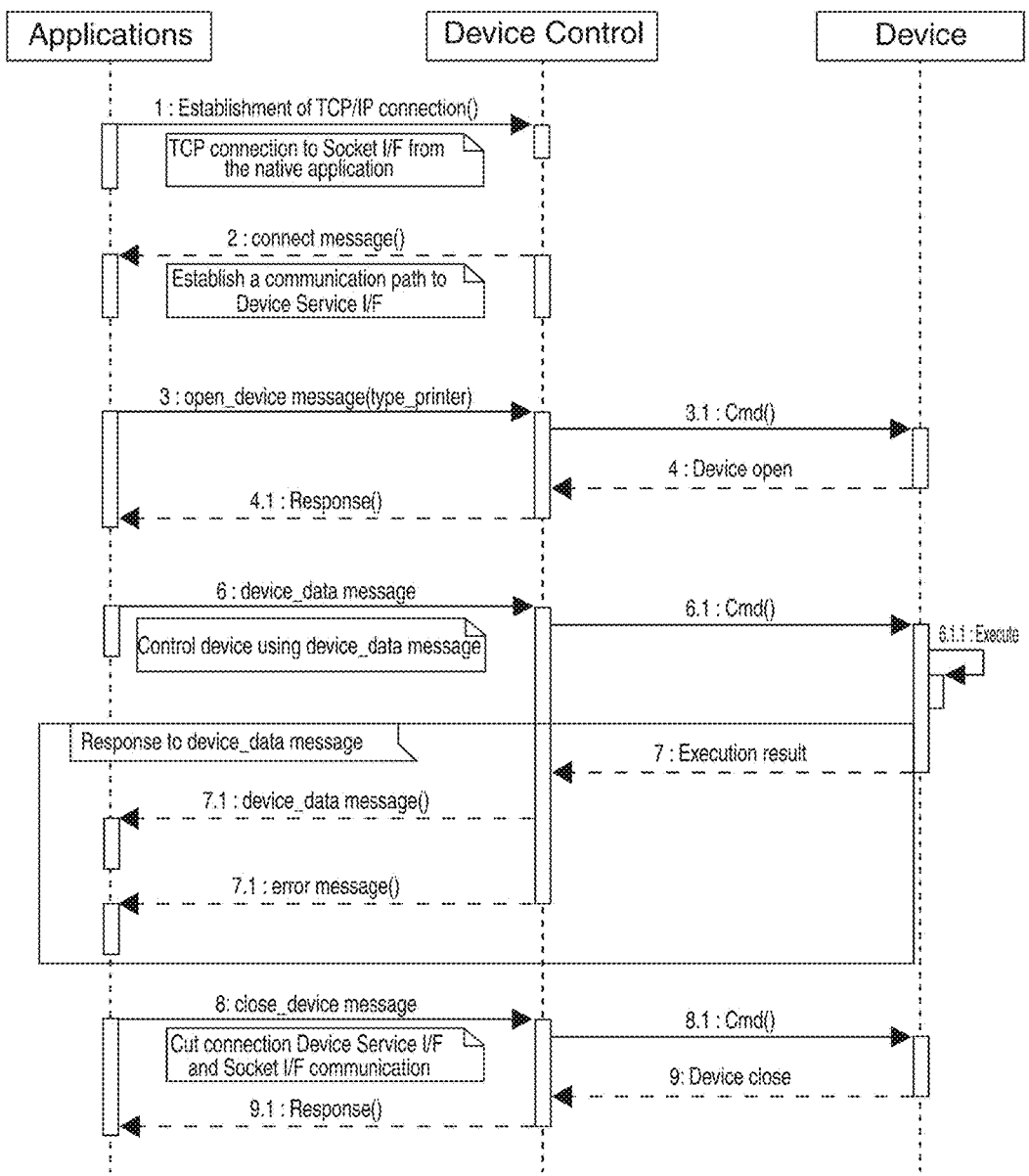
FIG. 17 illustrates the basic programming sequence.

The basic sequence of programming in Device XML is shown in FIG. 17.

Applications in FIG. 17 corresponds to application 31, Device Control indicates the device control function (device service interface 501), and Device denotes a controlled device.

1: Establish TCP connection. Establish a TCP connection to the socket interface from the application 31.

2: Connect message. Establish a communication path to the device service interface 501.

3: The application 31 sends an open_device message (type_printer).

3.1: Device service interface 501 sends a Cmd( ) command to device.

4: Device returns "Device open".

4.1: Device service interface 501 returns response.

6: Application 31 sends a device_data_message. Application 31 controls device using the device_data_message.

6.1: Cmd( ) command sent to device.

6.1.1: Device executes.

Device sends response to device_data_message.

7.: Device returns the execution result.

7.1: Device service interface 501 returns a device_data_message or error message.

8: Application 31 sends close_device_nmessage. The connection to the device service interface 501 and socket interface communication is terminated.

8.1: Device service interface 501 sends a Cmd( ) command to device.

9: Device closes.

9.1: Device service interface 501 returns response to application 31.

Figures 18, 19A, 19B:
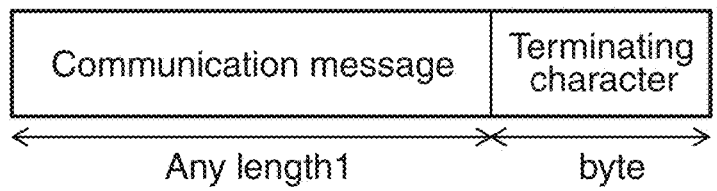
FIG. 18 shows the interface that is used.
FIG. 19A shows the data format.
FIG. 19B shows the data content.

The interface shown in FIG. 18 is used to control devices using Device XML.

The format of each data item is as shown in FIG. 19A, and FIG. 19B shows a description of each data item.

Examples of communication data between the application 31 and the device service interface 501 are shown in FIG. 20A and FIG. 20B. In FIG. 20A and FIG. 20B, the NULL character is represented by "\0". FIG. 20A and FIG. 20B show examples of communication data when establishing a connection, acquiring administrator information, opening a device, controlling a device, and closing a device.

The method of creating an array of <data> elements in a <device_data> message is described next.

The following programming method is used to describe an array in the <data> tag:

Set the attribute array="true" in the first element in the array.

Then specify the value of each additional array element using the same name for each element.

FIG. 21 shows sample code to create the array keycodes= [49, 50, 51, 52].

Device XML is described next. An ePOS-Device XML List is shown.

The following are included in ePOS-Device XML.

Message (FIG. 22)

This is XML for request messages from the application 31 to the printer 5, and response messages from the printer 5 to the application 31.

Message data for each device (FIG. 23)

This is XML for storing request and response data for each controlled device. This forms a sub-element of the <data> element of a <device_data> message.

Message data for each device is described next.

Message data for each device specifies the data that controls the device in a sub-element of the <data> element of a <device_data> message.

The component elements of the message data differ according to the device type.

Before specifying the data, declare the type of message data using the <type> element and then specify the data of the sub-element. The <type> elements that can be used for each type of device are shown in FIG. 23.

Messages are described next.

<connect>

This message is contained in a [Response].

This message returns to the application that a connection was established.

The application 31 sends a message described below triggered by receiving this message.

Example

<admin_info>

Returns the administrator information set in the printer 5. The information is set with the TMNet WebConfig utility.

This message is contained in a [Request].

This message requests administrator information from the printer 5.

Example

This message is contained in a [Response].

This message returns the administrator information to the application 31. A description of the sub-elements and data types is shown in FIG. 24A.

code

FIG. 24B shows the code elements.

data

FIG. 24C shows the data elements.

Character strings in the received data are described next. The strings shown in FIG. 24D are escaped.

Example

FIG. 24E shows examples of normal and error responses.
<open_device>

This message makes the device linked to the device ID usable. Exclusive use of the specified device is given to the requesting application 31.

This message is contained in a [Request].

This message specifies the device to open. A description of the sub-elements and data types is shown in FIG. 25A.
data FIG. 25B shows the data elements.

Example

FIG. 25C shows an example of a request.

This message is contained in a [Response].

This message returns the device open result to the application 31. A description of the sub-elements and data types is shown in FIG. 25D.
code FIG. 25E shows the code elements.

Example

FIG. 25F shows examples of normal and error responses.
<close_device>

This message closes an opened device.

This message is contained in a [Request].

This message specifies the device to close. A description of the sub-elements and data types is shown in FIG. 26A.

Example

FIG. 26B shows an example of a request.

This message is contained in a [Response].

This message returns the device close result to the application 31. A description of the sub-elements and data types is shown in FIG. 26C.
code FIG. 26D shows the code elements.

Example

FIG. 26E shows examples of normal and error responses.
<device_data>

This message is contained in a [Request].

This message sends data to a device. Device control commands, and print and display data are included. A description of the sub-elements and data types is shown in FIG. 27A.

Example

FIG. 27B shows an example of a request.

This message is contained in a [Response].

This message returns data from the device. The result of device control, events that occurred in the device, and input data from the device are included. A description of the sub-elements and data types is shown in FIG. 27C.

Example

FIG. 27D shows an example of a response.
<error>

This message is contained in a [Response].

This message returns device control command and service control command errors, and other common errors. A description of the sub-elements and data types is shown in FIG. 28A.
code FIG. 28B shows the code elements.

Example

FIG. 28C shows an example of a response.

Message data for the barcode scanner is described next.
<type>ondata</type>

This message is contained in a [Response].

This message returns scanned data from the barcode scanner to the application. A description of the sub-elements and data types is shown in FIG. 29A.

Character strings in the received data are described next. The strings shown in FIG. 29B are escaped.

Example

FIG. 29C shows an example of a response.

Message data for the printer is described next.

Print data is described below in Printer Control XML.
<type>print</type>

This message is contained in a [Request].

This message sends print data and settings data to the printer. A description of the sub-elements and data types is shown in FIG. 30A.

Example

FIG. 30B shows an example of a request.
<type>onxmlresult</type>

This message is contained in a [Response].

This message returns the print result to the application. A description of the sub-elements and data types is shown in FIG. 31A.

Example

FIG. 31B shows an example of a response.

Printer Control XML, which is an XML document that controls a printer, is described next.

Message data for a printer is described below under Message Data for Printers.
<epos-print>

This is an XML document sent from an application to a printer. This document instructs the printer to execute a specified function. <epos-print> contains the element.
[Attribute]
  xmlns
  This attribute declares the epos-print name.
[Sub-elements] FIG. 32A shows the sub-elements.

Example

FIG. 32B shows a sample XML document.
<response>

This is an XML document that is returned from the printer to the application.

[Attribute]
success

This attribute gets the display result. FIG. 33A shows the attribute values.
code This attribute gets the error code. FIG. 32B shows the attribute values.
status This attribute gets an OR function as a decimal expression according to the printer status. FIG. 32C shows the attribute values.

Example

FIG. 33D shows a sample XML document.
<text>

This message specifies the character string to print. This message also configures string-related settings such as style, print position, and line feed space.

To print content other than text after printing text, execute a line feed or paper feed.

In page mode, characters are printed from the current print position referenced to the baseline dot of the characters (printer specifications, page 151).

[Entity Reference]

Horizontal tab, line feed, and other symbols required for printer control are written using the entity references shown in FIG. 34A.

[Attribute]
lang

This attribute specifies the language. FIG. 34B shows the attribute values.

The printable character codes depend upon the specifications of the printer.
font This attribute specifies the character font. FIG. 34C shows the attribute values.

If Japanese is specified, characters can be printed using Shift JIS codes.
smooth This attribute specifies smoothing. Text printing quality improves if smoothing is enabled. FIG. 34D shows the attribute values.
dw This attribute specifies double-sized width. FIG. 34E shows the attribute values.

If the dw attribute and the width attribute are both specified in one element, the horizontal scale specified by the width attribute takes precedence.
dh This attribute specifies double-sized height. FIG. 34F shows the attribute values.

If the dh attribute and the height attribute are both specified in one element, the vertical scale specified by the height attribute takes precedence.
width This attribute specifies horizontal scaling. FIG. 34G shows the attribute values.

If the dw attribute and the width attribute are both specified in one element, the horizontal scale specified by the width attribute takes precedence.
height This attribute specifies vertical scaling. FIG. 34H shows the attribute values.

If the dh attribute and the height attribute are both specified in one element, the vertical scale specified by the height attribute takes precedence.
reverse This attribute specifies inverting the black and white parts of characters. FIG. 34I shows the attribute values.
ul This attribute specifies underlining. FIG. 34J shows the attribute values.
em This attribute specifies emphasized printing. FIG. 34K shows the attribute values.
color This attribute specifies the character color. FIG. 34L shows the attribute values.
x
(Default: "0")

This attribute specifies the print start position of the characters in dots.

In page mode this is the same as the horizontal print position specified by the position element, but the print position moves on the horizontal axis.
align This attribute specifies text alignment. FIG. 34M shows the attribute values.

In the standard mode, the align attribute controls where the line starts.

The align attribute set in this element also applies to the align attribute of image, logo, barcode, and symbol elements.
rotate This attribute specifies rotated printing of text. FIG. 34N shows the attribute values.

The rotate attribute is ignored in page mode.

In page mode, the print direction is set to right to left (right_to_left) using the direction element to print text rotated 180 degrees.

The rotate attribute set in this element also applies to the rotate attribute of the barcode and symbol elements.
linespc
(Default: "30")

This attribute specifies the paper feed distance for one line in dots.

Example

FIG. 34P shows an example of settings for printing a string.
<feed>

This message specifies the paper feed distance. This message specifies the paper feed distance in dots or in lines. When the paper feed amount is not specified, the paper is fed one line (line feed). This message also sets the paper feed distance per line.

[Attributes]
unit

This attribute specifies the paper feed distance in dots.
line

This attribute specifies the paper feed distance in lines.
linespc
(Default: "30")

This attribute specifies the paper feed distance per line in dots.

If the paper feed distance per line is 30 dots, a maximum paper feed distance of 240 lines can be specified.

The paper feed distance is stored separately for the standard mode and the page mode. Specifying the linespc attribute also affects the linespc attributes of the <text> and <feed> elements that follow.

Example

FIG. 35 shows a sample XML document.
<image>
This message specifies raster bit image data. (Data type xs:base64Binary)
Raster graphics refer to data generated by horizontally scanning the pixels of an image starting from an origin at the top left corner of the image.
Data is generated at 1 bit per pixel for two-tone images, and 4 bits per pixel for 16-tone images, starting from the most-significant bit of each byte. Zero padding is added so that scan data is in byte units for each line.
To print a raster image at high speed, specify "left" for the align attribute and specify a multiple of 8 that does not exceed the printer paper width for the width attribute.
In page mode, raster images are printed from the current print position referenced to the bottom left dot of the raster image. The print position does not move.
In page mode, set the print position so that raster images do not extend beyond the print area.
   Barcodes and two-dimensional symbols are printed as two-tone images because scanning quality is affected when printed as multiple-tone raster images.
   Use the ePOS-Print XML generator tool or other user application to create raster graphic bit-images. Note the following when using a user application.
   Two-tone images: Specify a multiple of 8 for the image width or fill the missing bits with zeros.
   16-tone image: Specify a multiple of 2 for the image width or fill the missing bits with zeros.
[Attribute]
  width
  [] This attribute specifies the image width in dots.
  height
  [] [] This attribute specifies the image height in dots.
  color
  [] [] This attribute specifies the character color. FIG. 36A shows the attribute values.
  align
  [] This attribute specifies the print position. FIG. 36B shows the attribute values.
The align attribute set in this element also applies to the align attribute in the text, logo, barcode, and symbol elements.
  mode
  (Option (option))
  This attribute specifies the color mode. FIG. 36C shows the attribute values.

Example

FIG. 36D shows a sample XML document.
<logo>
This message specifies a logo registered in the NV memory of the printer.
A logo must first be registered in the printer using a model-specific utility or logo registration utility (TM-FLogo).
In page mode, logos are printed from the current print position referenced to the bottom left dot of the logo.

[Attribute]
  key1
  [] This attribute specifies the value of key code 1 set at the time of NV logo registration.
  key2
  [] [] This attribute specifies the value of key code 2 set at the time of NV logo registration. This attribute is required.
  align
  [] [] This attribute specifies the print position. FIG. 37A shows the attribute values.
The align attribute set in this element also applies to the align attribute in the text, logo, barcode, and symbol elements.

Example

FIG. 37B shows a sample XML document.
<barcode>
This message specifies barcode data as a character string.
A barcode will not be printed if the settings are not compliant with the barcode standard, or if the barcode will be larger than the print area of the printer.
In page mode, a barcode is printed from the current print position referenced to the bottom left dot of the barcode (not including the HRI).
[Barcode Types]
FIG. 38A, FIG. 38B, and FIG. 38C show barcode types that can be specified.
FIG. 38D shows the escape sequences used to specify binary data that cannot be represented by a character string.
[Attribute]
  type
  [] This attribute specifies the barcode type. FIG. 38E shows the attribute values.
  hri
  This attribute specifies the HRI position. FIG. 38F shows the attribute values.
  font
  This attribute specifies the HRI font. FIG. 38G shows the attribute values.
  width
  (Default: "3")
  This attribute specifies the module width in dots. Specify an integer from 2 to 6.
  height
  (Default: "162")
  This attribute specifies the module height in dots.
  align
  This attribute specifies the print position. FIG. 38H shows the attribute values.
The align attribute set in this element also applies to the align attribute in the text, image, logo, and symbol elements.
  rotate
  This attribute specifies rotated printing. FIG. 38I shows the attribute values.
The rotate attribute set in this element also applies to the rotate attribute in the text and symbol elements.

Example

FIG. 38J shows a sample XML document.
<symbol>
This message prints a two-dimensional symbol.
This message specifies the two-dimensional symbol as a character string.
A two-dimensional symbol will not be printed if the settings are not compliant with the two-dimensional symbol standard, or if the two-dimensional symbol will be larger than the print area of the printer.

In page mode, a two-dimensional symbol is printed from the current print position referenced to the bottom left dot of the two-dimensional symbol.

[Two-Dimensional Symbol Types]

FIG. 39A and FIG. 39B show two-dimensional symbol types that can be specified.

FIG. 39C shows the escape sequences used to specify binary data that cannot be represented by a character string.

[Attribute]

type

This attribute specifies the type of two-dimensional symbol. FIG. 39D shows the attribute values.

level

This attribute specifies the error correction level. FIG. 39E shows the attribute values.

The error correction level is selected according to the type of two-dimensional symbol.

Select the default for MaxiCode and two-dimensional GS1 DataBar symbols.

width

This attribute specifies the width of one module in dots. FIG. 39F shows a description.

height

This attribute specifies the height of one module in dots. FIG. 39G shows a description.

size

FIG. 39H shows a description.

align

This attribute specifies the print position. FIG. 39I shows the attribute values.

The align attribute set in this element also applies to the align attribute in the text, image, logo, and barcode elements.

rotate

This attribute specifies rotated printing. FIG. 39J shows the attribute values.

The rotate attribute set in this element also applies to the rotate attribute in the text and barcode elements.

Example

FIG. 39K shows a sample XML document.

<hline>

This message specifies a horizontal line.

[Attribute]

x1

This attribute specifies the start position of the horizontal line (in dots).

x2

[] This attribute specifies the end position of the horizontal line (in dots).

style (Option)

This attribute specifies the type of horizontal line. FIG. 40A shows the attribute values.

Example

FIG. 40B shows a sample XML document.

<vline-begin>

This message starts drawing a vertical line.

This message cannot be used in page mode.

A vertical line is drawn until the end is specified by the <vline-end> message described below. This element is used with vline-end.

[Attribute]

x

[] This attribute specifies the start position of the vertical line (in dots).

style (Option)

This attribute specifies the type of vertical line. FIG. 41A shows sample attributes.

Example

FIG. 41B shows a sample XML document.

<vline-end>

This message stops drawing a vertical line.

This element is used with vline-begin described above.

[Attribute]

x

[] This attribute specifies the end position of the vertical line (in dots).

style (Optional)

This attribute specifies the type of vertical line. FIG. 42A shows sample attributes.

Example

FIG. 42B shows a sample XML document.

This message changes from the standard mode to the page mode.

[ elements]

The elements shown in FIG. 43A can be used in .

Example

FIG. 43B shows a sample XML document.

<area>

This message specifies the print area in page mode.

Figures 44A, 44B:
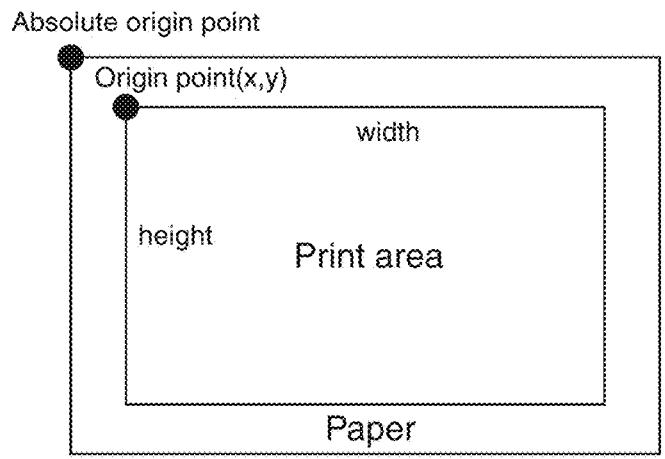
FIG. 44A illustrates an XML document for printer control.
FIG. 44B illustrates an XML document for printer control.

The print area is set by specifying the origin, width, and height referenced to the absolute origin. As shown in FIG. 44A, the absolute origin is a dot above the top left corner of the printable area.

Specify the print area according to the print content. If print data extends beyond the print area, the print data will not be completely printed.

This element is used in a page element.

[Attribute]

x (Default: "0")

This attribute specifies the origin on the horizontal axis in dots.

y (Default: "0")

This attribute specifies the origin on the vertical axis in dots.

width (Default: Varies according to type.)

This attribute specifies the width of the print area in dots.

height (Default: Varies according to type.)

This attribute specifies the height of the print area in dots.

Specify the width and height of the print area according to the print direction setting. The print data may not be completely printed.

Example

FIG. 44B shows a sample XML document.
<direction>
This message specifies the print direction in page mode.
This message specifies the print direction and rotates the print area. The starting point of the print area moves according to the rotation of the print area.
This element is used in a page element.
[Attribute]
dir
This attribute specifies the direction of rotation. FIG. 45A shows the attribute values.

Example

FIG. 45B shows a sample XML document.
<position>
This message specifies the print position in page mode.
This message specifies the print position referenced to the starting point of the print area. The starting point of the print area moves according to the direction of rotation.
This element is used in a page element.
[Attribute]
x
(Default: "0")
This attribute specifies the horizontal position in dots.
y
(Default: "21")
This attribute specifies the vertical position in dots.
This message specifies the print start position (coordinates) according to the content to be printed. Refer to the following.
To print a character string:
Specify the left end of the baseline of the first character. This is optional when for left-aligned printing of standard-sized characters. To print double-sized height characters, specify a value equal to or greater than "42" for y.
To print a barcode:
Specify the bottom left of the symbol. Specify the barcode height for y.
To print a graphic/logo:
Specify the bottom left of the graphic data. Specify the height of the graphic data for y.
To print a two-dimensional symbol:
Specify the top left of the symbol.

Example

FIG. 46 shows a sample XML document.
<line>
This message draws a straight line in page mode.
Diagonal lines cannot be printed.
This element is used in a page element.
[Attribute]
x1
This attribute specifies the position (in dots) to start printing a horizontal line.
y1
This attribute specifies the position (in dots) to start printing a vertical line.
x2
This attribute specifies the position (in dots) to stop printing a horizontal line.
y2
This attribute specifies the position (in dots) to stop printing a vertical line. Specify the line type.
style
(Optional)
This attribute specifies the line type. FIG. 47A shows the attribute values.

Example

FIG. 47B shows a sample XML document.
<rectangle>
This message draws a rectangle in page mode.
This element is used in a page element.
In standard mode, Use the Kline element, vline-begin element, and vline-end element are used.
[Attribute]
x1
This attribute specifies the position (in dots) to start printing a horizontal line.
y1
This attribute specifies the position (in dots) to start printing a vertical line.
x2
This attribute specifies the position (in dots) to stop printing a horizontal line.
y2
This attribute specifies the position (in dots) to stop printing a vertical line. Specify the line type.
style
(Optional)
This attribute specifies the line type. FIG. 48A shows examples of attributes.

Example

FIG. 48B shows a sample XML document.
<cut>
This message specifies a paper cut.
This message is used in standard mode.
This message executes at the beginning of a line. The paper is at the beginning of a line after the paper is cut.
[Attribute]
type
(Option)
This attribute specifies the type of cut. FIG. 49A shows examples of attributes.

Example

FIG. 49B shows a sample XML document.
<pulse>
This message specifies outputting a signal to the drawer kick-out connector. A buzzer can be sounded depending upon the model.
[Attribute]
drawer
(Option)
This attribute specifies the drawer kick-out connector. FIG. 50A shows the attribute values.
time
(Option)
This attribute specifies the drawer kick-out signal ON time. FIG. 50B shows the attribute values.

Example

FIG. shows a sample XML document.
<sound>
This message sounds a buzzer.

[Attribute]
    pattern
    (Option)
    This attribute specifies the buzzer pattern. FIG. 51A shows the attribute values.
    repeat
    (Optional, default: "1")
    This attribute specifies the number of times the buzzer sounds. FIG. 51B shows the attribute values.

Example

FIG. shows a sample XML document.
Message data for a customer display is described below.
Display data is described below in Customer Display Control XML.
<type>display</type>
[Request]
This message sends display data and setting data to the customer display. FIG. 52A shows sub-elements.

Example

FIG. 52B shows an example of a request.
<type>onxmlresult</type>
[Response] This message returns the result of sending to the customer display to the application. FIG. 53A shows the sub-element.

Example

FIG. 53B shows an example of a response.
Customer Display Control XML, which is an XML document that controls a customer display, is described next.
Message data for a customer display is described above under Message Data for the Customer Display.
<epos-display>
This is an XML document sent from the application to the customer display. This document requests the customer display to execute the specified function. An <epos-display> message contains sub-elements required to control the customer display.
[Attribute]
    xmlns
    This attribute declares the name of the epos-display. FIG. 54A shows sub-elements.

Example

FIG. 54B shows a sample XML document.
<response>
This is an XML document returned from the customer display to the application.
[Attribute]
    success
    This attribute gets the display result. FIG. 55A shows the attribute values.
    code
    This attribute gets the error code. FIG. 55B shows the attribute values.
    status
    This attribute is always set to 0.

Example

FIG. 55C shows a sample XML document.
<window>
This message controls creating and deleting windows and moving the current window.
  This message creates the defined window when the number, x, y, width, and height attributes are specified. Windows are defined to not overlap with an already defined window. The window size must be defined to fit in the customer display size (20 columns×2 rows).
  The specified window is deleted if the number attribute is defined and the destroy attribute is set to true.
  If the number attribute is defined when the attributes to create or delete a window are not defined, the current window moves to the specified window position.
[Attribute]
    number
    This attribute specifies the number of the target window. FIG. 56 shows the attribute values.
    x
    This attribute specifies the x-coordinate (1 to 20) as an integer to create a window.
    y
    This attribute specifies the y-coordinate (1 or 2) as an integer to create a window.
    Width
    This attribute specifies the width (1 to 20) as an integer to create a window.
    height
    This attribute specifies the height (1 or 2) as an integer to create a window.
    scrollmode
    This attribute specifies the scrolling method of the window when a window is created. FIG. 57A shows the attribute values.
    destroy
    This attribute specifies whether or not to delete the window specified by the number attribute. FIG. 57B shows the attribute values.
[Error Conditions]
When an error occurs, a value shown in FIG. 57C is returned.

Example

FIG. 57D shows a sample XML document.
<text>
This message controls displaying a character string.
  If x and y attributes are defined, text is displayed from the specified cursor position.
  If x and y attributes are not defined, text is displayed from the current cursor position.
[Attribute]
    x
    This attribute specifies the x-coordinate (1 to 20) of the text display as an integer.
    y
    This attribute specifies the y-coordinate (1 or 2) of the text display as an integer.
    reverse
    This attribute specifies shading for the displayed characters. FIG. 58A shows the attribute values.
    lang This attribute specifies the language of the text display. If omitted, the current setting is used. FIG. 58B shows the attribute values.

Example

FIG. 58C shows a sample XML document.
<cursor>
This message controls the cursor position and display settings.
  This message specifies the cursor coordinates in the display using the x and y attributes.
  This message specifies the cursor position in the current window using the moveto attribute.
  This message is ignored if x, y, and moveto attributes are all defined at the same time.
[Attribute]
  This attribute specifies the x-coordinate (1 to 20) of the cursor as an integer.
  y
  This attribute specifies the y-coordinate (1 or 2) of the cursor as an integer.
  moveto
  This attribute specifies the cursor position in the current window. FIG. 59A shows the attribute values.
  type
  This attribute specifies the display method of the cursor. If omitted, the current setting is used. FIG. 59B shows the attribute values.

Example

FIG. 59C shows a sample XML document.
<blink>
This message controls screen blinking. Blinking continues at the interval specified in the interval attribute.
  The actual blinking interval is rounded up in 50 ms increments.
  For example, if interval is 1 to 50, the actual interval is 50 ms; if the interval is 51 to 100, the actual interval is 100 ms.
[Attribute]
  interval
  This attribute specifies the blinking interval as an integer. FIG. 60A shows the attribute values.

Example

FIG. 60B shows a sample XML document.
<brightness>
This message controls the display brightness.
[Attribute]
  value
  This attribute specifies brightness as a percentage. FIG. 61A shows the attribute values.

Example

FIG. 61B shows a sample XML document.
<marquee>
This message controls the marquee display of a character string.
  The specified string is displayed 1 character at a time at the interval specified in uwait. After the string is displayed to the end, display pauses for the time specified by rwait, and the string is then displayed again from the beginning.

[Attribute]
  format
  This attribute specifies the display pattern for the marquee. FIG. 62A shows the attribute values.
  repeat
  This attribute specifies how many times the marquee is displayed. FIG. 62B shows the attribute values.
  uwait
  This attribute specifies the interval waited to display each character in milliseconds. FIG. 62C shows the attribute values.
  rwait
  This attribute specifies how long to wait after the end of the string is displayed in milliseconds. FIG. 62D shows the attribute values.
  lang
  This attribute specifies display language. If omitted, the current setting is used. FIG. 62E shows the attribute values.

Example

FIG. 62F shows a sample XML document.
<clock>
This message displays the time in the bottom right corner of the display.
  The displayed time is the local time managed by the OS of the printer 5.

Example

FIG. 63 shows a sample XML document.
<clear>
This message clears the display of the current window.
  If a window does not exist, the whole display is cleared.

Example

FIG. 64 shows a sample XML document.
<reset>
This message resets the display. Resetting the display results in the following.
  All character strings are cleared, and all registered windows are discarded.
  The cursor returns to the default state and moves to the origin of the display.
  Display blinking and display brightness return to the default settings.

Example

FIG. 65 shows a sample XML document.
<command>
This message executes a desired ESC/POS command.
  The desired command is specified by a hexadecimal string.

Example

FIG. 66 shows a sample XML document.
Message Data for a POS Keyboard is described next.
<type>onkeypress</type>
[Response]
This message returns input data from a POS keyboard to the application. FIG. 67A shows sub-elements.
(Character Strings in Received Data)
The character strings shown in FIG. 67B are escaped.

Example

FIG. 67C shows an example of a response.
<type>setprefix</type>

This message specifies the key code used to determine the start of a character string to detect input from the POS keyboard. If a key code specified by this message is input, the character string from then until the Enter key is pressed is returned in the onstring message. This is used, for example, to substitute input from the POS keyboard for barcode input. To stop the onstring message, send a setprefix message without a keycode.

[Request]

This message specifies the key code used to determine the start of a character string to detect input from the POS keyboard. FIG. 68A shows sub-elements.

Example

FIG. 68B shows an example of a request.
<type>onstring</type>

[Response]

This message returns input data from the POS keyboard to the application.

This message reports detection of input from any one of the key codes specified with setprefix to Enter. The detected key code information is acquired in the argument in addition to the input sequence of characters. FIG. 69A shows sub-elements.

(Character Strings in the Received Data)

The strings shown in FIG. 69B are escaped.

Example

FIG. 69C shows an example of a response.
Message Data for a Serial Device is described next.
<type>sendcommand</type>

[Request]

This message sends commands to the serial device. FIG. 70A shows sub-elements.

Example

FIG. 70B shows an example of a request.
<type>oncommandreply</type>

[Response]

This message returns data from the serial device to the application. FIG. 71A shows sub-elements.
status
FIG. 71B shows the attribute values.

Example

Figure 72:
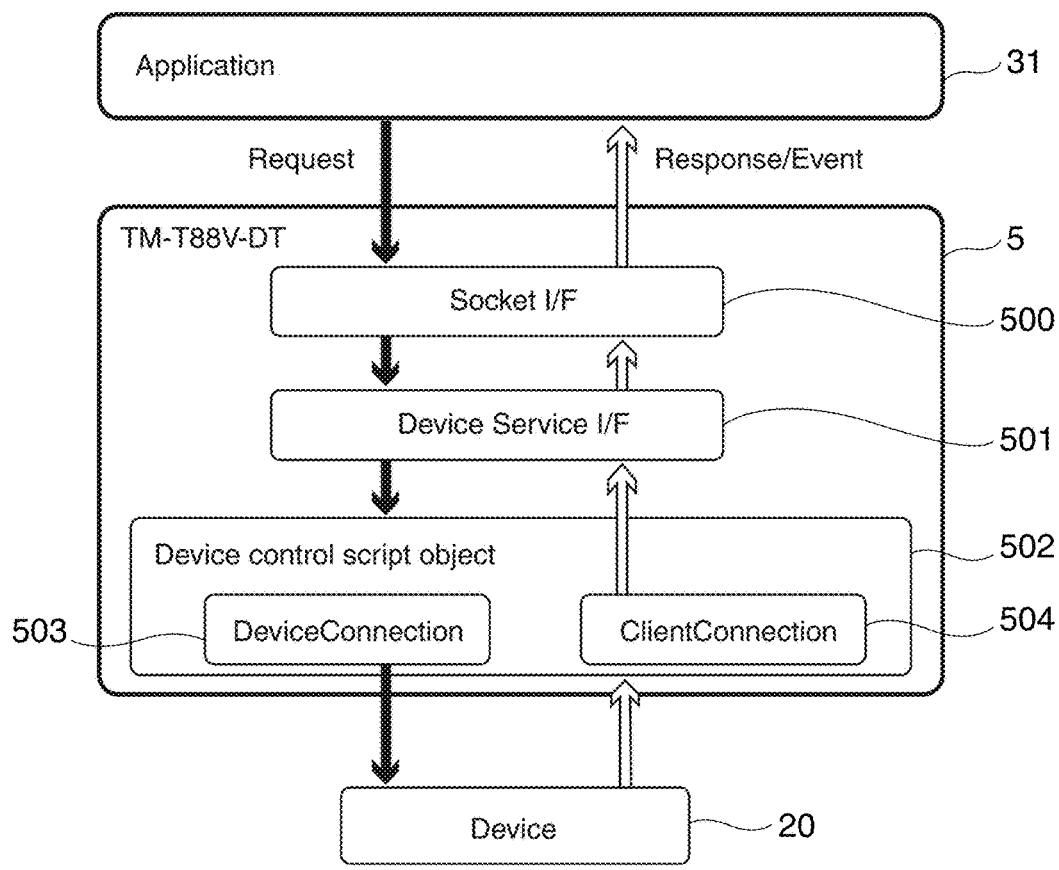
FIG. 72 illustrates a device control script.

FIG. 71C shows an example of a response.
The device control script 502 is described next.
Programming is described first.
FIG. 72 describes using a device control script.

By using the device control script API provided by the device control function of the invention, data processing by a device can be customized and new devices can be used from the application 31.

As shown in FIG. 72, a device control script 502 has a DeviceConnection object 503 and a ClientConnection object 504. In FIG. 81, devices of the highly functional printer 5 are collectively represented by device 20.

When XML data (Request) containing the open_device message described above is sent, the socket interface 500 of the printer 5 receives the XML data. The socket interface 500 then passes the received data to the device service interface 501. The device service interface 501 then instantiates an object so that the device control script corresponding to the device requested by the open_device message can be used. The device 20 can then be controlled through the instantiated object.

[Device Control Script Object]

The objects shown in FIG. 73 are then passed to the device control script 502 from the device service interface 501. By using the device connection (DeviceConnection) object 503 and client connection (ClientConnection) object 504, the device control script 502 can communicate with the application 31 and device 20.

Functions that use device control script objects are described next.

The following functions can be used using device control script APIs.

Desired events of application 31 side device objects can be called.

Data can be sent to a device.

Generated data can be received from the device.

The configuration of a device control script is described next.

A device control script is coded to include the following conditions.

The code required for device control must be contained in a single file.

(Only one file can be registered when configuring a device using the TMNetWebConfig utility.)

The part of the file name up to the first dot "." and the constructor name must be the same.

Example file name: Keyboard_Generic.ver1.0.js→constructor name: Keyboard_Generic Declare exports to externally reference a constructor.

Example exports.Keyboard_Generic=Keyboard_Generic

The device control script must have the properties shown in FIG. 74 and FIG. 75. An appropriate name is set using constructor.

DEVICE_TYPE property (object type: String)

A list of settings is shown in FIG. 74.

DEVICE_GROUP property (object type: String)

A list of settings is shown in FIG. 75.

Create an "onDeviceData" method to receive data generated by the device. For details, see the device control script Name object described below.

Create a method corresponding to the device object method that runs on the application 31. For details, refer to the Any event described below.

FIG. 76 shows an example of the configuration of a sample device control script 502.

A list of device control script APIs is shown.

The following objects are provided in the device control script API.

ClientConnection object (The API list is shown in FIG. 77.)

DeviceConnection object (The API list is shown in FIG. 78.)

Device control script Name object (The API list is shown in FIG. 79.)

The ClientConnection object is described next.

This object is an object passed to the first parameter of the constructor of the device control script 502.

send

This method sends data to a device object that runs on a browser.

[Syntax]

send (event, data);

[Parameters]

event: object type: (String)

This parameter specifies the event name of the device object.

data: object type: (Object)

This parameter specifies the data passed to the device object event.

An example is shown in FIG. 80. In this example, the onkeypress event of the device object is called, and 49 is received from data.keycode and 1 is received from data.ascii using the data parameter of the onkeypress event.

The DeviceConnection object is described next.

This object is an object passed in the second parameter of the constructor of the device control script 502.

send

This method sends data to a serial communication device.

[Syntax]

send (data);

[Parameters]

data: object type: (Buffer)

This parameter specifies the data to send to the device.

The device control script Name object is described next.

onDeviceData event (input device that can operate with an HID driver)

This event receives detected data from a key input device.

Events are described in this format in a device control script 502 for a key input device.

[Syntax]

onDeviceData (event, keycode, ascii);

[Parameters]

event: object type: (Number)

This parameter receives the direction of key operation. For a list of values, see FIG. 81.

keycode: object type: (Number)

This parameter receives the key code. For a list of key codes, see FIG. 3A and FIG. 3B.

ascii: object type: (String)

This parameter receives the character corresponding to the operated key.

If no character corresponds to the key code (such as with the F1 key), undefined is returned.

onDeviceData event (serial communication device)

This event receives data detected from a serial communication device.

Events are described in this format in a device control script 502 for serial communication.

[Syntax]

onDeviceData (data);

[Parameters]

data: object type: (Buffer)

This parameter receives data received from a serial communication device.

Any event

This event receives the results of API execution by a device object that runs on a browser.

[Syntax]

Name specified by callEvent (data);

[Parameters]

data: object type: (Object)

This parameter receives the object specified by the callEvent parameter of the device object.

A program is described next.

SUMMARY

Figure 82:
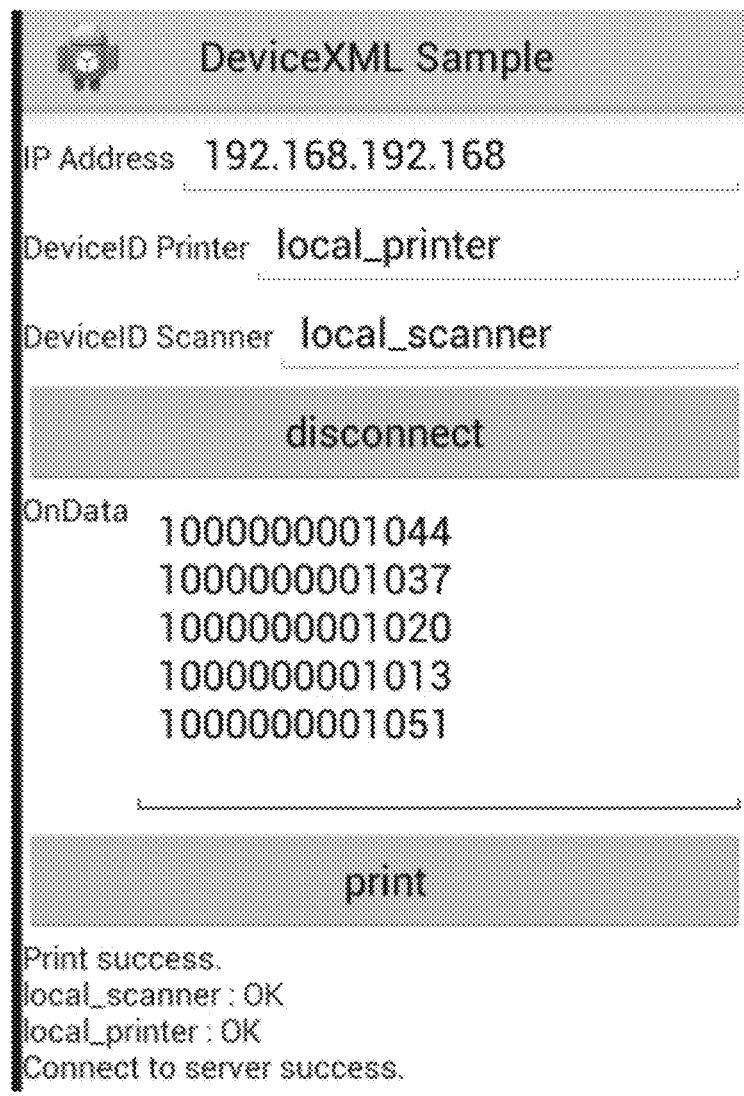
FIG. 82 illustrates a sample program.

As shown in FIG. 82, this program provides the ability to read data with the barcode scanner and print.

[Environment]

Devices printer 5 barcode scanner 9

Execution Environment

The following environment is described here.

Figure 83:
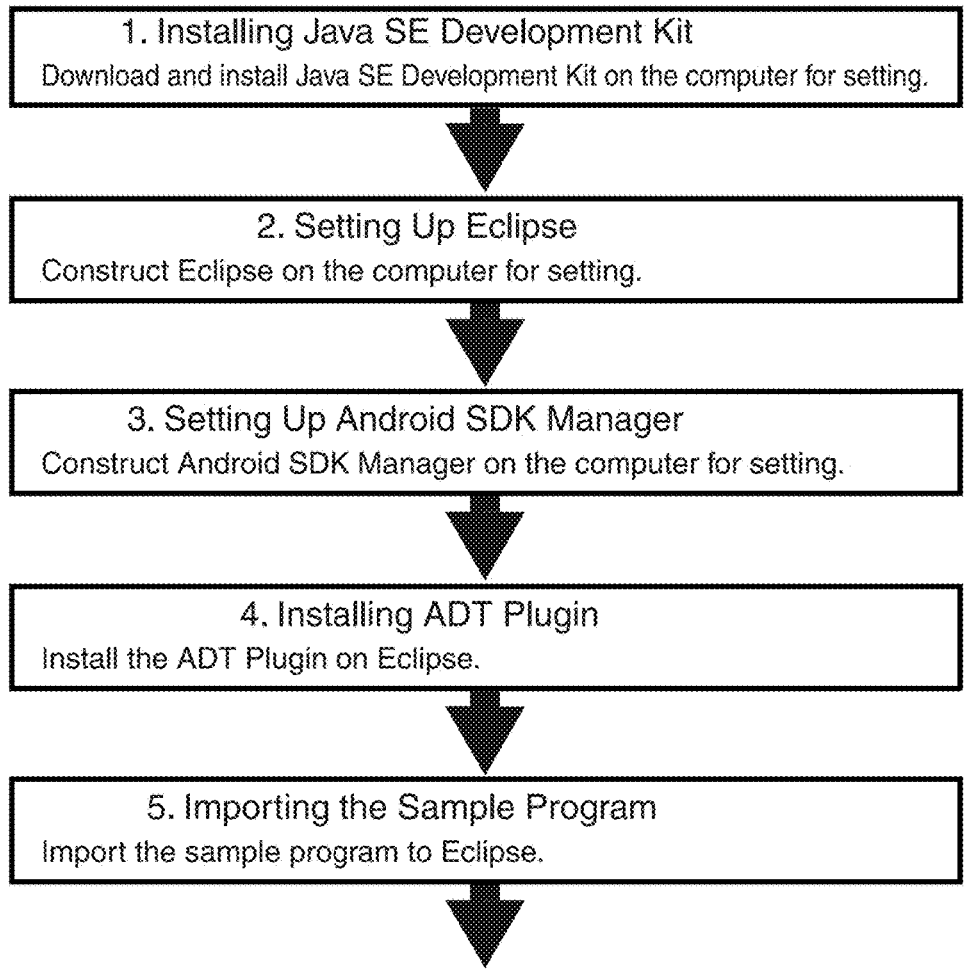
FIG. 83 illustrates the flow of constructing the environment of the sample program.
Figures 84A, 84B:
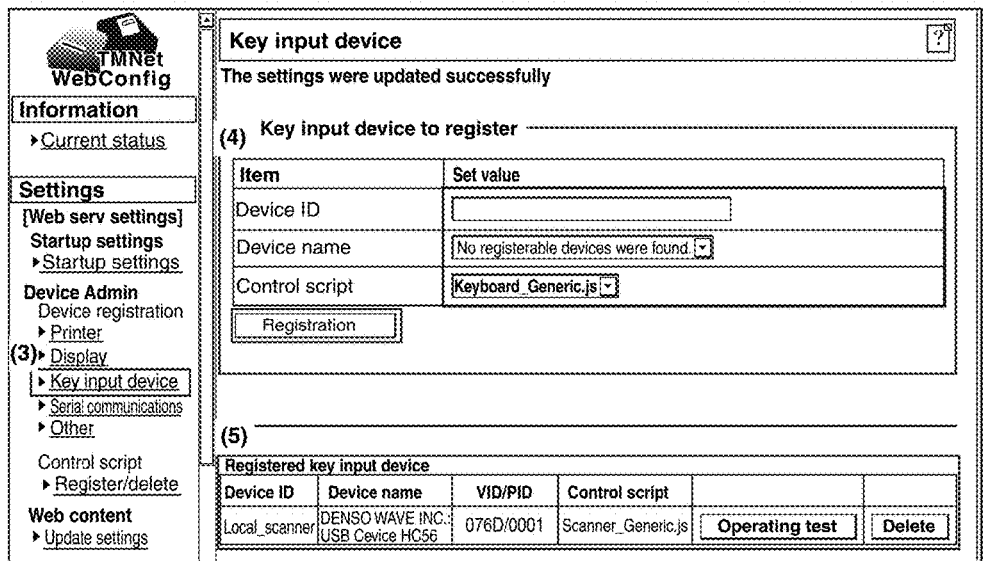
FIG. 84A illustrates the flow of constructing the environment of the sample program.
FIG. 84B illustrates the flow of constructing the environment of the sample program.

The work flow for building the program environment is shown in FIG. 83A.

1. Configure the network settings of the printer 5.

Configure the system and printer 5 network settings. The network settings of the printer 5 can be configured using either of the following methods.

Configure the Windows network settings on the printer 5.

Install the TMNet WinConfig utility on an external device (Windows computer) to configure the settings.

2. Connect the barcode scanner 9 to the printer 5.

Connect the barcode scanner 9 to the printer 5.

3. Configure the barcode scanner

Register the barcode scanner 9 in the printer 5. Registration is done from a web browser.

[Configuring a Barcode Scanner]

Register a barcode scanner 9 to be controlled by Device XML in the printer 5. The barcode scanner 9 is registered and configured using the TMNet WebConfig utility.

FIG. 94A shows an example of the TMNet WebConfig screen.

1. Confirm that the barcode scanner 9 is connected to the printer 5, and turn the printer 5 on.

2. Start the web browser on the computer used for configuring, and input the URL (http://IP address of printer 5/webconfig/).

3. The TMNetWebConfig utility starts. Click on [Web service settings]-[Device registration]-[Key input device] shown in (3) in FIG. 94A.

4. The "Key input device" screen is displayed. Set the items shown in FIG. 94B in the input fields shown in (4) in FIG. 94A, and click [Registration].

5. The registered barcode scanner is displayed in the [Registered key input devices] field in (5) in FIG. 94A.

As described above, a device control system 100 according to this embodiment of the invention has a terminal 3 that executes an application 31, and a printer 5 with a connection panel 60 to which a device connects, connected over a network. The terminal 3 sends XML data generated by the application 31 to the printer 5. The printer 5 receives the XML data sent from the terminal 3 through a socket interface 500. When the terminal 3 sends data requesting administrator information, the printer 5 sends the administrator information of the printer 5 to the terminal 3 using functions of a device service interface 501 and device control script 502. When the terminal 3 sends data requesting device control, the printer 5 controls the device. As a result, devices connected to the printer 5 can be controlled by a terminal 3 connected to the network. The terminal 3 can be any device that can run an application that generates data written in XML. Because XML is highly versatile, many different devices can be used as the terminal 3. Developing applications for the terminal 3 is also simple.

When the terminal 3 requests administrator information by sending data containing an <admin_info> message, the printer 5 returns XML data including the administrator name and/or location stored by the printer 5 to the terminal 3.

When the terminal 3 sends data including a device open request, the printer 5 enables controlling the device, and when the terminal 3 sends data including a device close request, the printer 5 disables control of the controlled device.

The data generated by the application 31 also includes message data that differs for each device connected to the printer 5, or message data common to devices.

When controlling a device requested by data, the printer 5 also instantiates a DeviceConnection object that sends data to the device, and a ClientConnection object that sends data to the terminal 3.

The foregoing embodiment obviously describes one example of the invention, and can be modified and adapted as desired within the scope of the accompanying claims.

The invention claimed is:

1. A point-of-sale printer for a point-of-sale (POS) system, the point-of-sale printer comprising:
    a first connector configured to connect to a scanner responsive to scanner-control commands, the scanner being external to the point-of-sale printer;
    a second connector configured to communicate with a terminal, to receive a markup language request from the terminal, and to send a markup language response to the terminal, the terminal being external to the point-of-sale printer;
    a controller configured to interpret the markup language request received from the terminal, and to control the scanner using the scanner-control commands to execute the interpreted markup language request;
    wherein the controller is configured to encode scanned data from the scanner as a markup language response and to send the markup language response to the terminal, the markup language response including a markup language element indicating a type of the scanner and a markup language sub-element indicative of the scanned data, and wherein the scanner-control commands are not in a markup language.

2. The point-of-sale printer described in claim 1, wherein the markup language response includes data denoting a result of scanner control.

3. The point-of-sale printer described in claim 1, wherein the point-of-sale printer is configured such that, when the point-of-sale printer receives from the terminal an establish communication markup language request to establish a communication link with the point-of-sale printer, the point-of-sale printer sends to the terminal a markup language response to the establish communication markup language request.

4. The point-of-sale printer described in claim 1, wherein the point-of-sale printer is configured such that, in response to the point-of-sale printer receiving from the terminal an open markup language request to open communication with the scanner connected to the point-of-sale printer, the point-of-sale printer sends to the terminal a markup language response to the open markup language request indicating whether a communication link with the scanner is established, as a result of scanner control.

5. The point-of-sale printer described in claim 1, wherein the point-of-sale printer is configured such that, in response to the point-of-sale printer receiving from the terminal a close markup language request to close communication with the scanner, the point-of-sale printer sends to the terminal a markup language response to the close markup language request indicating whether communication with the scanner is closed, as a result of scanner control.

6. The point-of-sale printer described in claim 1, wherein the first connector is a USB interface.

7. The point-of-sale printer described in claim 1, wherein the second connector is part of a computer network interface to connect with the terminal over a computer network.

* * * * *